(12) United States Patent
Sasaki

(10) Patent No.: US 8,385,636 B2
(45) Date of Patent: Feb. 26, 2013

(54) COLOR PROCESSING APPARATUS AND COMPUTER-READABLE MEDIUM

(75) Inventor: Makoto Sasaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 882 days.

(21) Appl. No.: 12/510,684

(22) Filed: Jul. 28, 2009

(65) Prior Publication Data

US 2010/0239159 A1 Sep. 23, 2010

(30) Foreign Application Priority Data

Mar. 23, 2009 (JP) .................................. 2009-070269

(51) Int. Cl.
*G06K 9/00* (2006.01)
(52) U.S. Cl. ...................................................... 382/162
(58) Field of Classification Search .......... 382/162–165, 382/167; 358/1.9, 518, 525
See application file for complete search history.

(56) References Cited

U.S. PATENT DOCUMENTS

| | | | |
|---|---|---|---|
| 6,100,999 | A | 8/2000 | Ikegami |
| 2004/0126009 | A1 | 7/2004 | Takenaka et al. |
| 2005/0062992 | A1 | 3/2005 | Kishimoto et al. |
| 2007/0165252 | A1 | 7/2007 | Sasaki |

FOREIGN PATENT DOCUMENTS

| | | |
|---|---|---|
| JP | A-10-262157 | 9/1998 |
| JP | A-2002-084434 | 3/2002 |
| JP | A-2004-180174 | 6/2004 |
| JP | A-2005-63093 | 3/2005 |
| JP | A-2005-176280 | 6/2005 |
| JP | A-2007-194745 | 8/2007 |

OTHER PUBLICATIONS

Mar. 14, 2012 Notification of Reasons for Refusal issued in Japanese Patent Application No. 2010-043176 (with translation).

*Primary Examiner* — Duy M Dang
(74) *Attorney, Agent, or Firm* — Oliff & Berridge, PLC

(57) ABSTRACT

A color processing method includes setting a color gamut constituted by combinations of values of M color components, wherein each combination has a minimum total sum of the values of the M color components among combinations that provide a corresponding one of target colors, and each combination meets a predetermined limitation; obtaining output color signals each having values of the M color components by controlling, within a range meeting the predetermined limit, combinations each providing any of colors within the set color gamut; and generating pairs each having a corresponding one of the output color signals and an input color signal which is in an input color space, corresponds to the corresponding one of the output color signals, represents a color within the set color gamut, and has values of N color components as elements where N is an integer smaller than M.

19 Claims, 19 Drawing Sheets

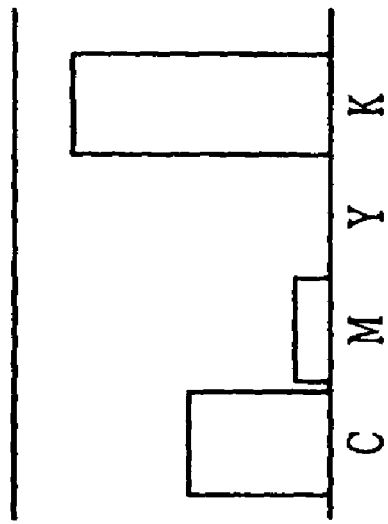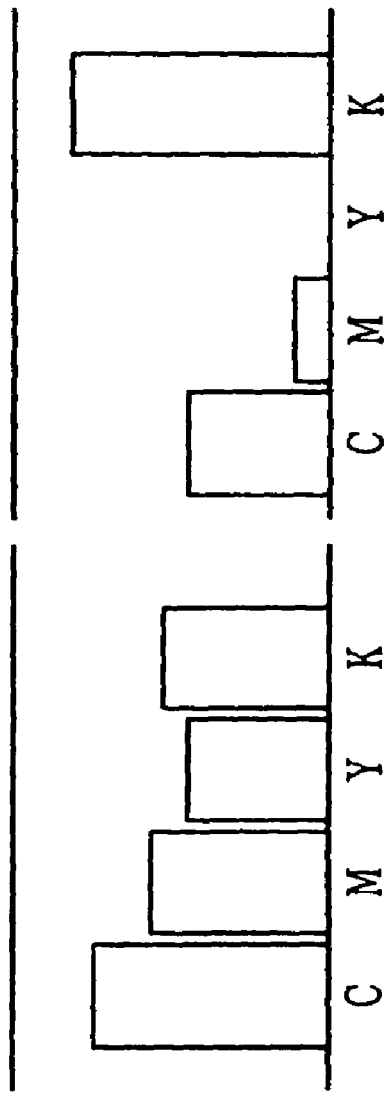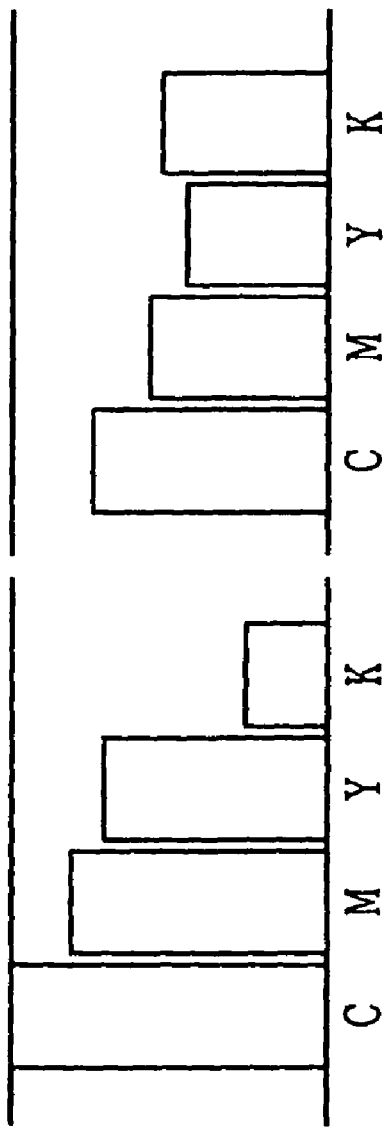

*FIG. 12*

| C | M | Y | K | R | TOTAL SUM | EXTRACTION |
|---|---|---|---|---|---|---|
| 0 | 8 0 | 5 0 | 2 0 | 1 0 | 1 6 0 | ○ |
| 0 | 2 0 | 0 | 1 0 | 5 0 | 8 0 | ○ |
| 0 | 9 0 | 8 0 | 9 0 | 1 0 0 | 3 6 0 | × |
| : | : | : | : | : | : | : |
| 0 | 5 0 | 8 0 | 8 0 | 7 0 | 2 8 0 | ○ |

K AND R MAXIMUM

REGION INCLUDING K

REGION INCLUDING K AND R

K AND R MINIMUM

REGION INCLUDING K

REGION INCLUDING K AND R

K MAXIMUM, R MINIMUM

REGION INCLUDING K

REGION INCLUDING K AND R

K AND R MINIMUM

REGION INCLUDING K

REGION INCLUDING K AND R

| C | M | Y | K | R |
|---|---|---|---|---|
| C0 | M0 | Y0 | K0 | R0 |
| C1 | M1 | Y1 | K1 | R1 |
| C2 | M2 | Y2 | K2 | R2 |
| : | : | : | : | : |
| Cn | Mn | Yn | Kn | Rn |

| L* | a* | b* |
|---|---|---|
| L0 | a0 | b0 |
| L1 | a1 | b1 |
| L2 | a2 | b2 |
| : | : | : |
| Ln | an | bn |

COLOR PROCESSING APPARATUS AND COMPUTER-READABLE MEDIUM

CROSS-REFERENCE TO RELATED APPLICATIONS

This application is based on and claims priority under 35 USC 119 from Japanese Patent Application No. 2009-70269 filed on Mar. 23, 2009.

BACKGROUND

1. Technical Field

The present invention relates to a color processing apparatus and a computer-readable medium storing a program that causes a computer to execute color processing.

2. Related Art

An output device outputs a color image using plural colors. In general, color components of a color signal received in the output device are different from colors used in the output of an image. Therefore, there is a need to convert the received color signal into a color signal having colors which are to be used as its components. As one example, the color signal received in the output device may include the L*a*b* color signal, a sRGB color signal, a sYCbCr color signal, etc. which are standardized device independent color signals. In addition to the basic colors, C (cyan), M (magenta), Y (yellow) or CMY and K (black) is used as colors in a color output device. Alternatively, in some cases, extra colors other than K may be additionally used.

As a method of converting a color signal received by an output device into a color signal having colors which are to be used as its components, for example, there is a method of using color conversion coefficients calculated by a physical model such as the Neugebauer equation. In addition, as methods of providing precise color matching, for example, there are methods described in JP Hei. 10-262157 A (which corresponds to U.S. Pat. No. 6,100,999) and JP 2002-84434 A, and a method of involving a correspondence relationship learning model using a neural network. That is, a color patch is generated corresponding to plural combinations for components of colors used by an output device, the color patch is output and colorimetrically measured, a correspondence relationship between the components of each color which is to be used and colorimetric values are modeled, and color conversion is performed using this model.

In addition, in recent years, in some cases, extra colors other than K have been used for improvement of granularity and enlargement of a color gamut. For example, there are cases of using six CMYKOG colors (O=orange, G=green) and seven CMYKRGB colors (R=red, G=green, B=blue). In these cases, a three-dimensional color signal received by an output device is converted into a six-dimensional or seven-dimensional color signal.

SUMMARY

According to an aspect of the invention, a color processing apparatus includes a color gamut setting unit, a signal control unit and a color signal pair generation unit. The color gamut setting unit sets a color gamut constituted by combinations of values of M color components where M is an integer equal to or larger than 4. Each combination of the values of the M color components constituting the color gamut has a minimum total sum of the values of the M color components among combinations of values of the M color components that provide a corresponding one of target colors by an output device that outputs a color using M colors. Each combination of the values of the M color components meets a predetermined limitation. The signal control unit obtains output color signals each having values of the M color components as elements by controlling, within a range meeting the predetermined limit, combinations of values of the M color components each of which provide any of colors within the color gamut set by the color gamut setting unit. The color signal pair generation unit generates pairs each having (i) a corresponding one of the output color signals obtained by the signal control unit and (ii) an input color signal which is in an input color space, corresponds to the corresponding one of the output color signals, represents a color within the set color gamut, and has values of N color components as elements where N is an integer smaller than M.

BRIEF DESCRIPTION OF THE DRAWINGS

Exemplary embodiments of the present invention will be described in detail below based on the accompanying drawings, wherein:

FIGS. 2A to 2C are explanatory views showing examples of a combination of M colors for reproducing a target color;

FIG. 12 is an explanatory view of an example of a process of selecting a combination of CMYKR which maximizes K and R within a total sum limitation;

DETAILED DESCRIPTION

Figure 1:
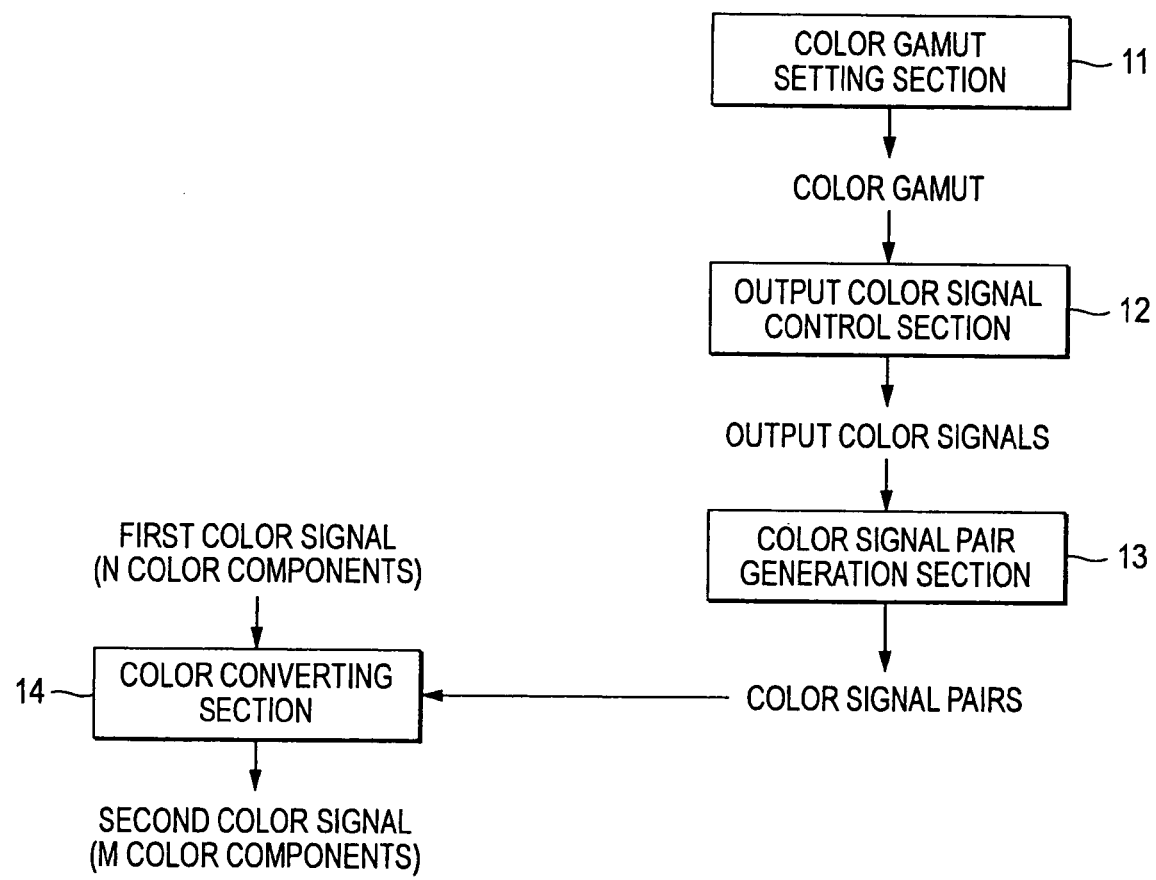
FIG. 1 is a configuration view showing a first exemplary embodiment of the present invention.

To begin with, for the purpose of facilitating an understanding of exemplary embodiments of the present invention, technologies to which the exemplary embodiments of the present invention are applied will be described.

As a method of converting a color signal received by an output device into a color signal having colors which are to be used as its components, there is a method of using the a color conversion model. For example, color patches are generated corresponding to plural combinations for components of colors used by an output device, the color patches are output and colorimetrically measured, a correspondence relationship between the components of the colors which are to be used and colorimetric values is modeled, and color conversion is performed using this model.

For example, when an output device receives an L*a*b* color signal and outputs an image using four CMYK colors, the modeled correspondence relationship is expressed as follows:

$$(L, a^*, b^*) = F(C, M, Y, K) \tag{Eq. 1}$$

where F denotes a function representing the modeled correspondence relationship. When the L*a*b* color signal is given and this model is used, CMYK may be calculated using a reverse conversion model expressed as follows:

$$(C, M, Y, K) = F^{-1}(L^*, a^*, b^*) \tag{Eq. 2}$$

This conversion is a conversion of L*a*b* as a three-dimensional color signal into CMYK as a four-dimensional color signal, and cannot mathematically obtain a unique solution. Therefore, one of CMYK, for example, K, is first determined by the following equation:

$$K = fk(L^*, a^*, b^*) \tag{Eq. 3}$$

Then, based on the determined K and L*a*b*, CMY is determined by the following equation:

$$(C, M, Y) = G^{-1}(L^*, a^*, b^*, K) \tag{Eq. 4}$$

"fk" in the equation 3 denotes a function for designing a method of giving K for L*a*b*. The function $G^{-1}$ is a function for determining CMY when K is determined in the function $F^{-1}$. For example, a solution may be calculated by giving L*a*b* and K to a forward conversion model, which is the function F expressed by the equation 1, and repeating an operation so that CMY converges. Alternatively, the method disclosed described in JP Hei. 10-262157 A (which corresponds to U.S. Pat. No. 6,100,999) and JP 2002-84434 A may be used.

The equation 3 and the equation 4 are examples in which an output device outputs an image using CMYK. For example, when five or more colors such as six CMYKOG colors (O=orange, G=green) or seven CMYKRGB colors (R=red, G=green, B=blue) are used, a three-dimensional color signal received by the output device is converted into a six-dimensional or seven-dimensional color signal. For example, when the color signal received by the output device is an L*a*b* color signal and an image is output using seven CMYKRGB colors, the L*a*b* color signal is converted into a CMYKRGB color signal.

As a conversion method when such five or more colors are used, there is a method of expanding the method using the equations 3 and 4. That is, this method is a method of determining extra color components according to the following equations 5 to 7 and calculating CMY as principal color components according to the following equation 8:

$$R = f_R(L^*, a^*, b^*) \tag{Eq. 5}$$

$$G = f_G(L^*, a^*, b^*) \tag{Eq. 6}$$

$$B = f_B(L^*, a^*, b^*) \tag{Eq. 7}$$

$$(C, M, Y) = F^{-1}(L^*, a^*, b^*, K, R, G, B) \tag{Eq. 8}$$

In this manner, even when colors are used which have a larger number of color components than those of the color signal received by the output device, a color signal is obtained which has the colors which are to be used as its components.

In this conversion process, when extra color components (KRGB) are calculated according to the equations 3 and 5 to 7, KRGB is determined so that CMYKRGB eventually calculated according to the equation 8 falls within a color gamut. Accordingly, in JP 2005-176280 A, a maximum value or a minimum value of KRGB is calculated by a search algorithm which requires a long time for processing. In addition, in JP 2007-194745 A (which corresponds to US 2007/0165252 A), it is guaranteed that CMYKRGB falls within a color gamut by obtaining L*a*b* from CMYKRGB within a color gamut obtained by expanding a color gamut of CMY.

In general, there is a case where a total sum of color materials used in an output device is limited. For example, in an output device of an electrophotography type, in many cases, there are limitations on a total sum of toners in order to prevent deterioration of an image quality or the like due to excessive fixation of toner onto a sheet. In addition, in an output device of a liquid ejection type, there are cases where a total sum of inks is limited in connection with permeation or drying. In these cases, the total sum limitation, for example, a condition that a value of C+M+Y+K for CMYK is set to be equal to or less than a predetermined value, has to be satisfied.

In addition to the total sum limitation, in order to suppress a relief feeling or the like, there are cases where a one color max value limitation on each color component is imposed. Typically a value of each color component takes 0% to 100%. However, under this one color max value limitation, a limitation is imposed on a value of each color component such as C (cyan)≦80%.

When such limitations are set, a color signal obtained by conversion, for example, CMYKRGB, is required to fall within a color gamut meeting such limitations. In the method described in JP 2007-194745 A (which corresponds to US 2007/0165252 A), a conversion meeting a limitation is performed by obtaining L*a*b* from CMYKRGB meeting the limitation. However, the color gamut is expanded from a color gamut which is reproduced using three CMY colors, by adding KRGB thereto. Therefore, for example, in the case of a combination of only KR which does not use the basic CMY color components, a color which would have originally been reproduced may not be output if the above-described total amount limitation is strict. Accordingly, it may be required to perform color conversion which meets the limitation while fully using a color gamut.

The full use of the color gamut may cause a problem when five or more colors including K and a extra color other than K added to CMY are used. For example, if a maximum value or a minimum value is calculated by a search process, search time is impractical since it increases by the square of the number of extra colors. Exemplary embodiments of the present invention provide a technique of fully using a color gamut in either or both of (i) a case where a limitation is imposed on an output device and (ii) a case where five or more colors are used.

Hereinafter, exemplary embodiments of the present invention will be described. For the purpose of facilitating an understanding of the exemplary embodiments of the present invention, it is assumed that an output device provided as an example in the exemplary embodiments of the present invention receives a color signal in the L*a*b* color space and outputs an image using color materials of four to seven colors such as CMYK, CMYKR, CMYKRG, CMYKRGB or the like (C=cyan, M=magenta, Y=yellow, K=black, R=red, G=green and B=blue). Here, a color space having colors of color materials which are to be used as its axes is assumed as the output color space. An input color space and an output color space are not limited to this example, but may be any input color space and any output color space so long as the dimension (N) of the input color space<the dimension (M) of the output color space. For example, the input color space may be the sYCbCr color space, the XYZ color space or the like in addition to the L*a*b* color space. Also, the output color space may be a color space including color components such as CMYKOG (O=orange), CMYKOV (V=violet) or the like in addition to the CMYKRGB color space. In addition, it is assumed that CMY colors used in an output signal are called 'primary colors' and KRGB (OV) or the like other than the primary colors are called 'extra colors' and are used to expand a color gamut or improve granularity. Of course, this is only by way of example, but RGB are assumed as primary colors and other colors are assumed as extra colors depending on the kind of output devices.

FIG. 1 is a configuration view showing a first exemplary embodiment of the present invention. In the figure, reference numeral 11 denotes a color gamut setting section, reference numeral 12 denotes an output color signal control section, reference numeral 13 denotes a color signal pair generation section, and reference numeral 14 denotes a color converting section. The color gamut setting section 11 sets a color gamut constituted by combinations of values of M color components where M is in a range of four to seven in this exemplary embodiment. Each combination of the values of the M color components constituting the color gamut has a minimum total sum of the values of the M color components among combinations of values of the M color components that provide a corresponding one of target colors by an output device that outputs a color using M colors. Each combination of the values of the M color components meets a predetermined limitation. Here, examples of the limitation include a limitation that a total sum of values of the M color component falls within a total sum limitation imposed on an output device, and a limitation that each value of the M color components falls within a one color max value limitation for each color component imposed on an output device. The color gamut set by the color gamut setting section 11 is the widest color gamut meeting the predetermined limitation, which will be described later, among all color gamuts reproduced by the output device.

The output color signal control section 12 controls combinations of the M color components, each of which provides a color within the color gamut set by the color gamut setting section 11, between (i) a combination having a minimum total sum of values of the M color component among combinations of values of the M color components that provide the color and (ii) a combination having a maximum total sum of values of the M color components among the combinations of values of the M color components that provide the color and within a range meeting the predetermined limitation, so as to obtain an output color signal having the M color components as its elements. For example, if a total amount limitation is set as a limitation and the maximum value of the total sum of the values of the M color components, which provide a certain color, exceeds the total amount limitation, a combination of the values of the M color components is controlled between (i) the combination, which provides the certain color and has the minimum total sum of the values of the M color components, and (ii) the combination, which provides the certain color and has the maximum total sum of the values of the M color components. In this case, the controlled combination may be either the combination, which has the minimum total sum, or the combination, which has the total sum being equal to the total amount limitation. In addition, if the maximum value of the total sum of the values of the M color component, which provides a certain color, does not exceed the total amount limitation, the controlled combination may be the combination, which has the maximum total sum. Of course, if a different limitation is set, the combination of the values of the M color components may be controlled within a range meeting the set limitation.

The color signal pair generation section 13 generates pairs each having an output color signal, which is obtained by the output color signal control section 12, and an input color signal which is in an input color space and represents a color corresponding to the output color signal. The pairs of the input color signal and the output color signal may be generated based on colors uniformly arranged in an inside and an outline of the color gamut set by the color gamut setting section 11. As described above, the number N of color components of the input color signal<the number M of color components of the output color signal. Therefore, an output color signal is not uniquely determined from an input color signal. However, input color signals corresponding to output color signals are uniquely determined, respectively, and the pairs therebetween are generated.

The color converting section 14 performs color conversion of a first color signal in the input color space into a second color signal in an output color space based on the plural pairs of the output color signal and the input color signal, which are generated by the color signal pair generation section 13. For example, a color conversion model may be generated based on the plural pairs of output color signal and input color signal, and conversion of the first color signal into the second color signal may be performed using the color conversion model. Alternatively, the plural pairs of output color signal and input color signal may be used as a conversion table, and conversion of the first color signal into the second color signal may be performed in combination with an interpolation operation. Of course, a different conversion method may be employed.

In addition, the first exemplary embodiment may be configured without the color converting section 14 so that the plural pairs of output color signal and input color signal generated by the color signal pair generation section 13 are output or that a color conversion model is generated and output based on the plural pairs of output color signal and input color signal. In this case, the color converting section 14, which performs color conversion using the plural pairs of output color signal and input color signal or the color conversion model, which is generated based on the plural pairs of output color signal and input color signal, may be provided as a separate device.

The above configuration of the first exemplary embodiment of the present invention will be further described. The basic idea of the first exemplary embodiment of the present invention is to first obtain a maximum color gamut meeting a limitation imposed on an output device, obtain output color signals and input color signals in a one-to-one correspondence which meet the limitation within the set color gamut, and then perform color conversion. For this purpose, the color gamut setting section 11 obtains the maximum color gamut meeting the set limitation.

A range of colors which is reproduced by an output device is called a "color gamut". If a certain color within the color gamut is focused on and if the certain color (target color) is reproduced with color materials of M colors, there are plural combinations of color material amounts of M colors. FIGS. 2A to 2C are explanatory views showing examples of a combination of M colors for reproducing a target color. In the figures, it is assumed that four CMYK colors are used. FIGS. 2A to 2C show examples in which respective CMY colors are substituted with K using UCR (Under Color Removal) for the purpose of simplicity. FIGS. 2A to 2C show the cases where the UCR rates are 0%, 50% and 100%, respectively. Although the figure shows only three cases, various combinations of CMYK may be generated by controlling the UCR rate. Here, considering the total sum of four color values, the total sum becomes largest when K is minimized as shown in FIG. 2A, and the total sum becomes smallest when K is maximized as shown in FIG. 2C.

Figure 3A:
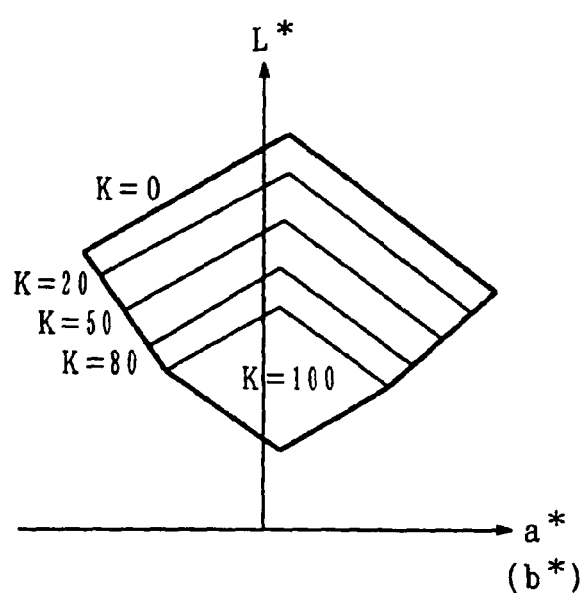
FIGS. 3A and 3B are explanatory views showing examples of a color gamut in the L*a*b* color space when an output device uses CMYK.
Figure 3B:
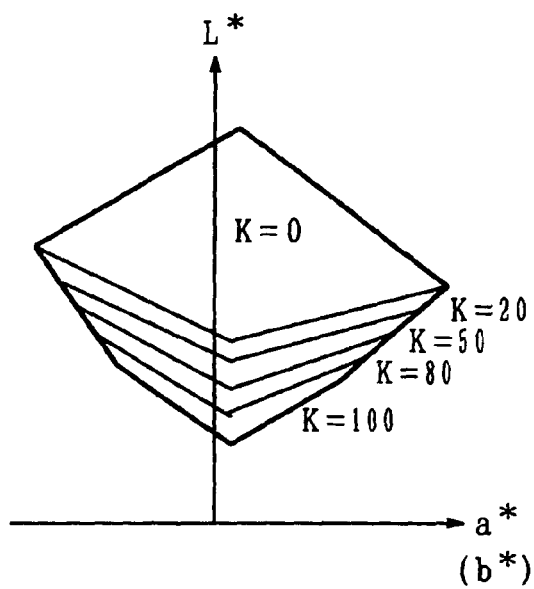

FIGS. 3A and 3B are explanatory views showing examples of a color gamut in the L*a*b* color space when an output device uses CMYK. For example, in the case where an output device uses CMYK colors, when a range of colors output from the output device is represented in the L*a*b* color space, the range of colors is indicated by thick lines in FIGS. 3A and 3B. As shown in FIGS. 2A to 2C, a value of K to reproduce one target color in the output device depends on the design of color reproduction, and K may be used maximally or minimally. For example, FIG. 3A shows a change of a color gamut outline when K is used maximally, and FIG. 3B shows a change of a color gamut outline when K is used minimally. For example, a color gamut outline indicated by K=50 in FIG. 3A represents colors in which one of CMY is 0% and K of 50% or less is added. That is, although K is used maximally, K of only less than 50% can be used for a color having L* larger than the color gamut outline indicated by K=50. On the contrary, for example, a color gamut outline indicated by K=50 in FIG. 3B represents that one of CMY is 100% and that a color on this color gamut outline cannot be reproduced unless K of at least 50% is added. That is, although K is suppressed to minimum, K is required to be increased for a color having L* smaller than this color gamut outline indicated by K=50.

As can be seen from shapes of color gamut outlines (thick lines) shown in FIGS. 3A and 3B, in a state where no limitation is imposed, the range of reproduced colors remains unchanged irrespective of whether K is used maximally or minimally. Accordingly, in the inside of the color gamut, a combination of CMYK may be changed within a range between a combination of CMYK when K is used maximally and a combination of CMYK when K is used minimally. In addition, an outline of the color gamut has a relationship that a value Kmax of K when K is used maximally is equal to a value Kmin of K when K is used minimally, i.e., Kmax=Kmin.

Figure 4A:
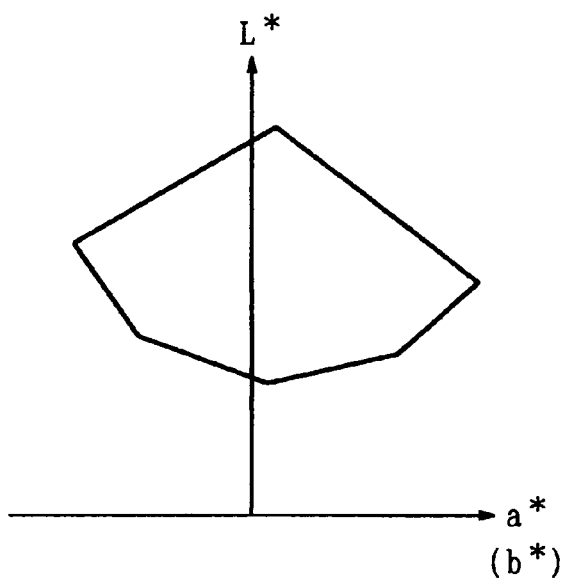
FIGS. 4A and 4B are explanatory views showing examples of a color gamut in the L*a*b* color space when a total sum limitation is imposed on an output device.
Figure 4B:
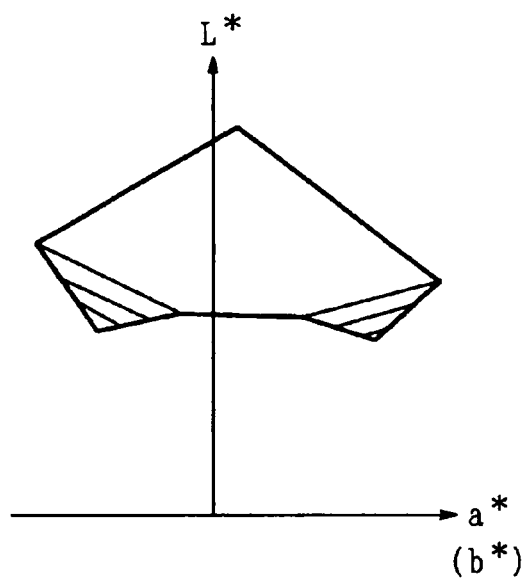

FIGS. 2A to 2C and 3A to 3B show the cases where no limitation is imposed. Now, for example, a case will be described where a total amount limitation is imposed for values of color components used by an output device. FIGS. 4A and 4B are explanatory views showing examples of a color gamut in the L*a*b* color space when a total amount limitation is imposed on an output device. FIGS. 4A and 4B also show that, for example, the output device uses CMYK colors and that the range of colors output from the output device is represented in the L*a*b* color space. FIG. 4A shows a change of a color gamut outline when K is used maximally, and FIG. 4B shows a change of a color gamut outline when K is used minimally. As shown in FIGS. 2A to 2C, when K is used maximally, a total sum of CMYK becomes small as compared with the case where K is used minimally. Accordingly, as can be seen from a comparison between FIG. 4A and FIG. 4B, a color gamut for the case where K is used maximally includes colors having smaller L* values that those included in a color gamut for the case where K is used minimally. A color gamut outline for the case where K is set between the maximum value and the minimum value is located in the color gamut outlines shown in FIGS. 4A and 4B. Also, the color gamut becomes widest when K is used maximally.

In this manner, when the total amount limitation is imposed on an output device, it can be seen that the widest color gamut is secured when K is used maximally. Accordingly, when combinations of CMYK each having a minimum total sum of CMYK and meeting the total sum limitation are obtained with K being used maximally, the widest color gamut meeting the total sum limitation can be secured. From this point of view, the color gamut setting section 11 obtains combinations each meeting the total amount limitation and having a minimum total sum of values of CMYK, and sets a color gamut constituted by the obtained combinations.

Figure 5:
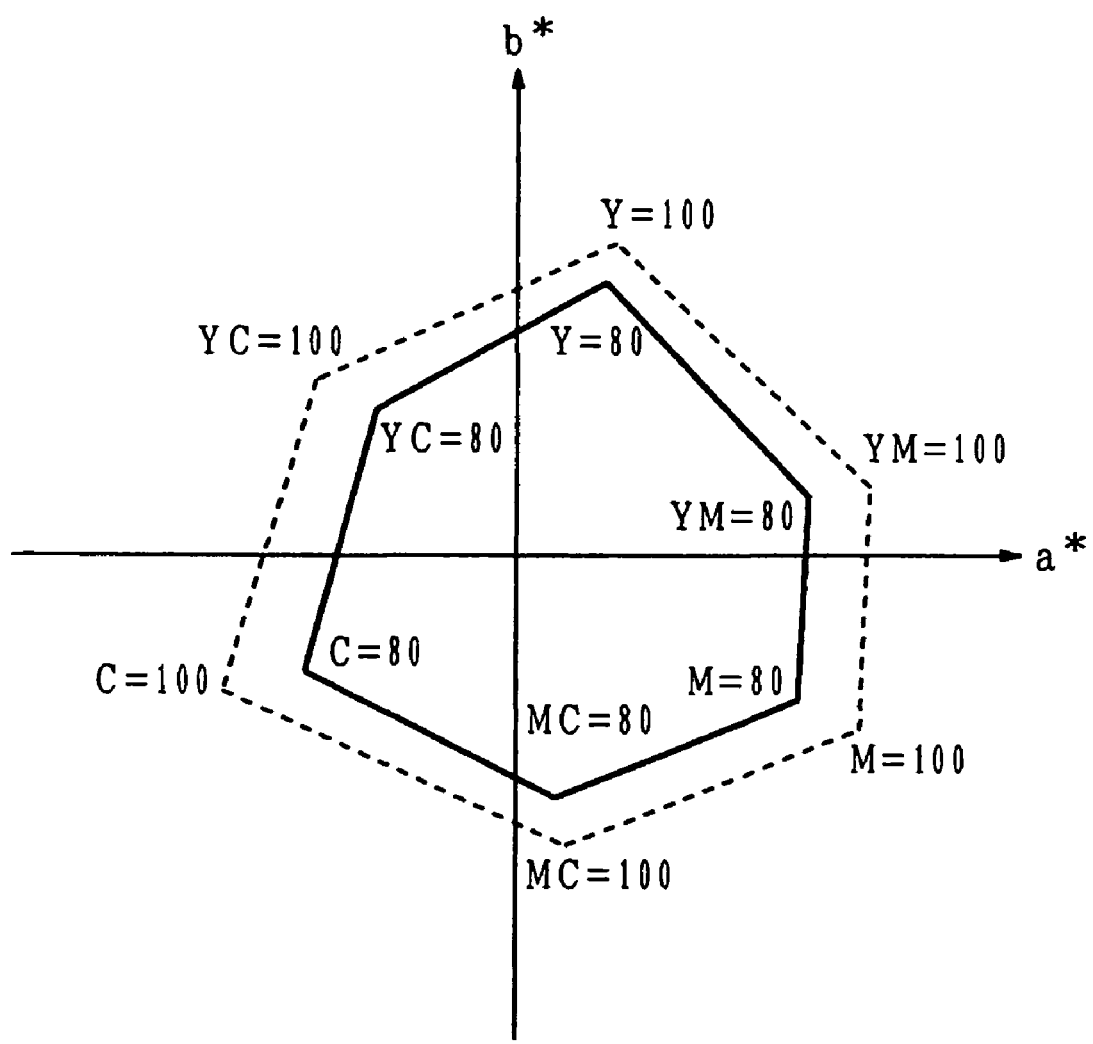
FIG. 5 is an explanatory view of an example of a color gamut in the L*a*b* color space when a one color max value limitation is imposed on an output device.

The above description shows the case where the total amount limitation is imposed on an output device. A limitation is not limited to the total amount limitation but may be imposed in various ways to be coped with. FIG. 5 is an explanatory view showing an example of a color gamut in the L*a*b* color space when a one color max value limitation is imposed on an output device. For example, FIG. 5 shows a color gamut in the L*a*b* color space when the output device uses colors of CMYK and a one color max value limitation that each color component is within 80% is imposed on the output device. This figure shows a color gamut viewed from a high lightness side of L*.

Even if such a one color max value limitation is imposed on the output device, when combinations each having a minimum total sum among all combinations of CMYK to reproduce a target color is obtained within a range in which each color component meets the one color max value limitation, the widest color gamut meeting the one color max value limitation is secured. Of course, in addition to the above-mentioned one color max value limitation and total amount limitation, for the cases where other limitations are imposed, when combinations each meeting the other limitations and having a minimum total sum among all combinations of CMYK to reproduce the target color, the widest color gamut meeting the other limitations is secured.

Figure 6:
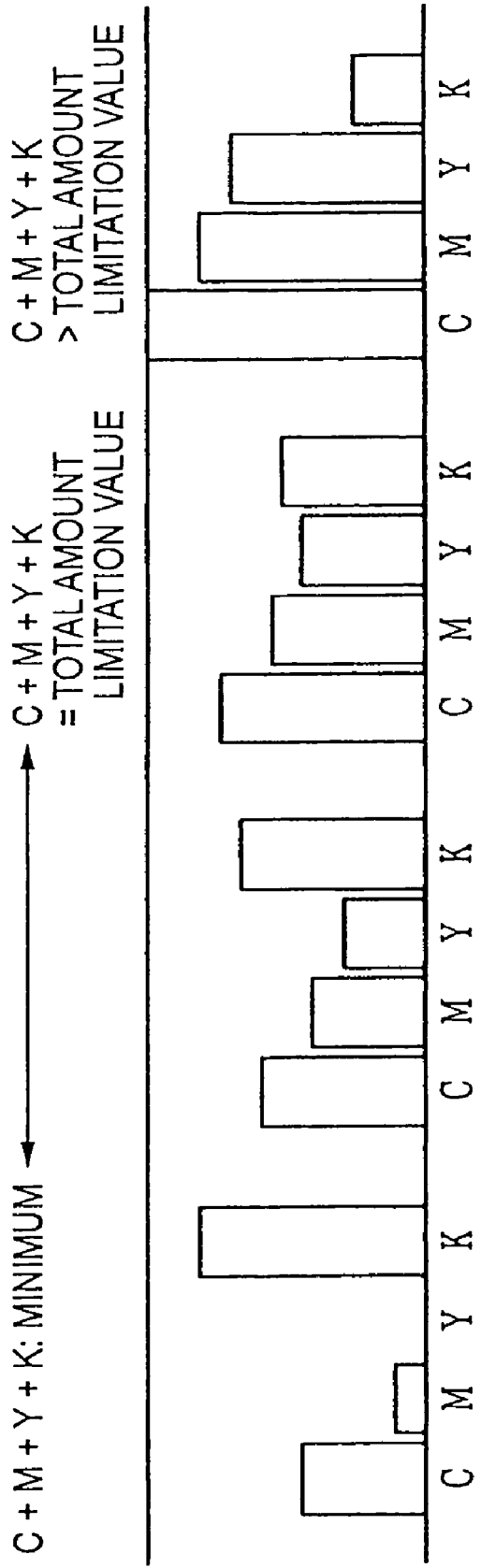
FIGS. 6A to 6D are explanatory views showing an example of a combination control of color components in an output color signal control section.

In this manner, when the widest color gamut meeting the imposed limitation(s) is secured, it is guaranteed that there exist one or more combinations of CMYK for each color within the color gamut. The output color signal control section 12 selects one of the existing one or more combinations of CMYK. FIGS. 6A to 6D are explanatory views showing an example of combination control of color components in the output color signal control section 12. For example, when the above-mentioned total amount limitation is imposed, there exists combinations of CMYK between a combination of CMYK having a minimum total sum and a combination of CMYK having a maximum total sum or a total sum being equal to the total amount limitation. A combination of CMYK values may be controlled within this range. For example, FIG. 6A shows an example of a combination of CMYK having a minimum total sum, and this combination may be selected. Also, FIG. 6C shows an example of a combination of CMYK having a total sum being equal to the total amount limitation, and this combination may be selected. Alternatively, as shown in an example of FIG. 6B, a combination of CMYK between the minimum total amount and the total amount limitation may be selected.

FIG. 6D shows a combination of CMYK having a maximum total amount where this combination exceeds the total amount limitation. In this case, the combination of CMYK may be controlled to be between the minimum total amount and the total amount limitation. Even if a combination has a maximum total sum, if this combination does not exceed the total amount limitation, the combination of CMYK may be controlled between the maximum total sum and the minimum total sum. Of course, for example, if a one color max value limitation and/or another limitation are imposed, the combination of CMYK may be controlled within a range of such a limitation.

In addition, as a color within a color gamut corresponding to the combination of CMYK obtained by the output color signal control section 12, a color which is within the color gamut and which is any of the target colors used in the color gamut setting section 11 may be used. Or a combination of CMYK for a separately set color may be obtained as a color within a color gamut corresponding to the combination of CMYK obtained by the output color signal control section 12. This combination of CMYK may be generated based on colors which are uniformly arranged in an inside and an outline of the color gamut set by the color gamut setting section 11.

A method of controlling the combination of CMYK within a certain range, as described above, may follow a design policy showing how to use K. For example, for a design policy which uses K maximally, a combination of CMYK may be employed in which the total sum of CMYK becomes minimum. For a design policy which uses K minimally, a combination of CMYK may be employed in which the total sum of CMYK becomes maximum or a limitation value such as a total amount limitation. Also, for example, different design policies may be considered including a design policy which reduces a ratio of K as lightness increases, a design policy which reduces a ratio of K as saturation increases, etc. Since a color gamut has been set, if a color is in the inside or on an outline of the color gamut, the combination of CMYK, which is in a range between a combination having the minimum total sum of CMYK and a combination having the maximum total sum of CMYK or a limitation value, may be controlled according to various design policies.

Figure 7:
FIG. 7 is an explanatory view of an example of pairs of output color signals and input color signals which are obtained in a color signal pair generation section 13.

When the combinations of CMYK controlled by the output color signal control section 12 are obtained, the color signal pair generation section 13 acquires the obtained combinations of CMYK as output color signals, obtains input color signals in an input color space corresponding to the output color signals, and generates pairs of the output color signals and the input color signals. For example, if the input color space is the L*a*b* color space, conversion of the output color signals into the input color signals may be performed using, for example, the model expressed by the above equation 1, and each input color signal is uniquely determined since this example is the four-dimension to three-dimension conversion. FIG. 7 is an explanatory view showing an example of pairs of output color signal and input color signal obtained by the color signal pair generation section 13. For example, an output color signal (C0, M0, Y0, K0) may correspond to an input color signal (L0, a0, b0) obtained by converting this output color signal. Such a pair of the output color signal and the input signal is generated for each output color signal obtained by the output color signal control section 12.

The color converting section 14 performs color conversion of a first color signal (a color signal to be converted) in the input color space (L*a*b* color space) into a second color signal (a conversion result color signal) in the output color space (CMYK color space) using the plural pairs of the output color signal (here CMYK) and the input color signal (here L*a*b*), which are obtained by the color signal pair generation section 13. For example, conversion of the first color signal into the second color signal may be performed using the pairs of the output color signal and the input color signal shown in FIG. 7 as a conversion table in combination with an interpolation operation. Alternatively, for example, a color conversion model may be generated based on the plural pairs of the output color signal and the input color signal, and conversion of the first color signal into the second color signal may be performed using the generated color conversion model. An example of the configuration of this case will be described below.

Figure 8:
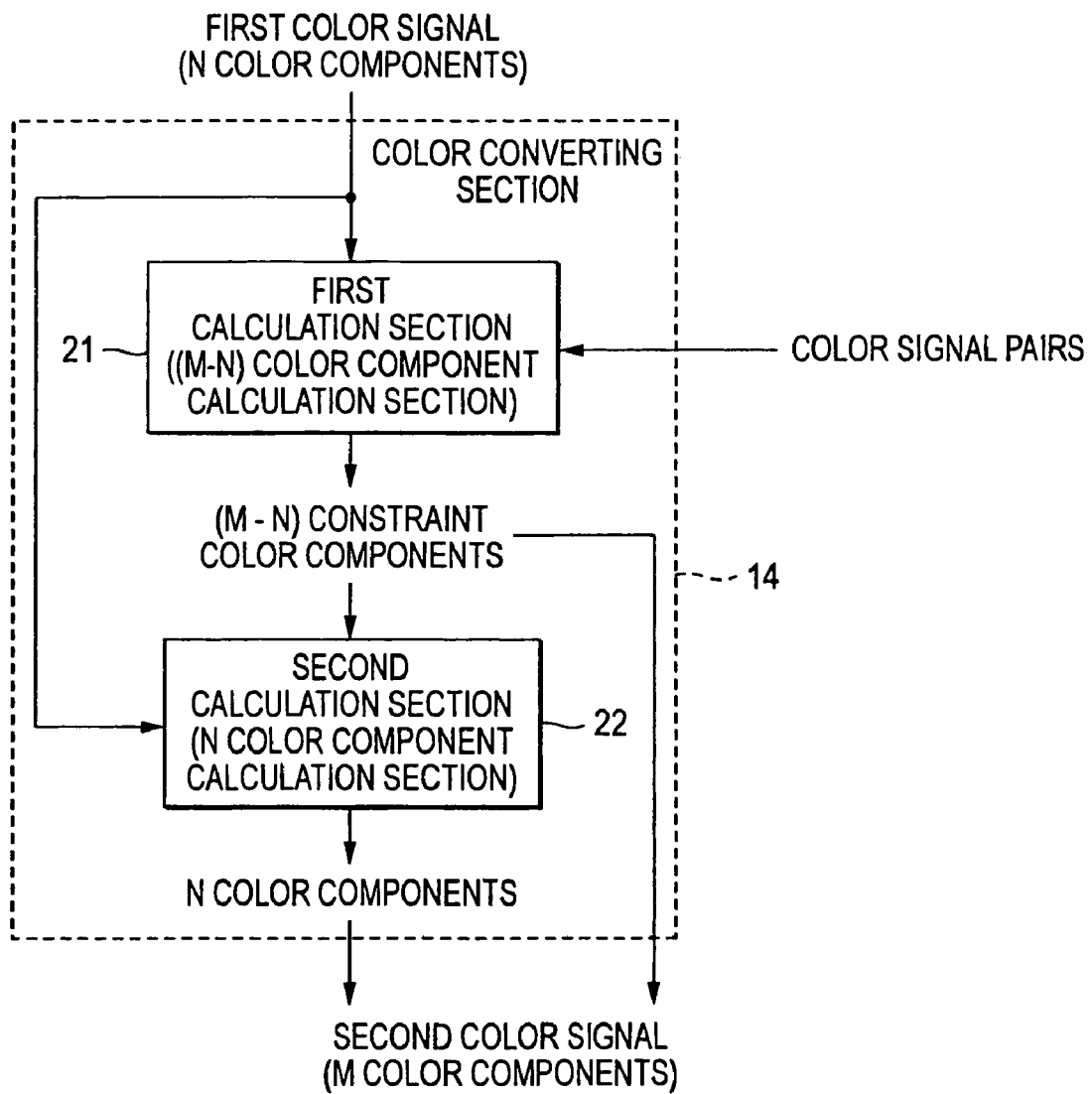
FIG. 8 is a configuration view showing an example of a color converting section 14.

FIG. 8 is a configuration view showing an example of the color converting section 14. In the figure, reference numeral 21 denotes a first calculation section ((M−N) color component calculation section) and reference numeral 22 denotes a second calculation section (N color component calculation section). The first calculation section 21 calculates (M−N) color components of the second color signal in the output color space based pm the first color signal in the input color space and the plural pairs of the output color signal and the input color signal, which are generated by the color signal pair generation section 13. The (M−N) color components may be extra color components such as color components which improve granularity of an image to be output by the output device, color components which expand a color gamut reproduced by the output device, or the like For example, when the input color space is L*a*b* and the output color space is CMYK as in the above example, M=4, N=3, and (M−N) (=1) color component is calculated. In this case, for example, K may be calculated. For the calculation of K, L*a*b* and K may be extracted from the pairs of the output color signal CMYK and the input color signal L*a*b*, and the extracted L*a*b* and K may be modeled as fk of the equation 3, and K may be obtained from the given first color signal L*a*b*. If an extra color other than K is used, a model is generated from the extra color and L*a*b*, and a color component of the extra color may be obtained based on the model. For example, when the output color space is CMYKR, K may be obtained using fk, a function fr may be modeled from R of the output color signal and L*a*b* of the input color signal, and R may be obtained from L*a*b* of the given first color signal. For example, when the output color space is CMYKRGB, M=7, N=3, M−N=4, and four colors of K, R, G and B may be respectively obtained from the first color signal L*a*b*.

The second calculation section 22 calculates the remaining N color components of the second color signal based on the first color signal and the (M−N) color components of the second color signal calculated by the first calculation section 21.

For example, when the input color space is L*a*b*, the output color space is CMYK, and K of the second color signal is obtained by the first calculation section 21 as in the above example, the second calculation section 22 calculates each CMY color component of the second color signal from the first color signal L*a*b* and K of the second color signal. In this case, the each color component may be calculated using the equation 4. The function $G^{-1}$ in the equation 4 may be generated using a model which is obtained based on the output device in advance. For example, a model may be used which is generated from color patches output from the output device and their colorimetric values.

Also, the model F, which is the base of the function fk of the equation 3 and the function $G^{-1}$ of the equation 4, may use, for example, the method described in JP Hei. 10-262157 A (which corresponds to U.S. Pat. No. 6,100,999) and JP 2002-84434 A, or a neural network, etc.

With the above configuration of the color converting section 14, the number of unknown quantities when the first calculation section 21 performs calculation by inversely using the model F of the output device is made so as to be smaller than the number of known quantities. When the output device uses CMYK color materials, as the first calculation section 21 calculates K of the second color signal from the first color signal L*a*b*, the number of unknown quantities becomes three of CMY and the number of known quantities becomes four of L*a*b*K. Accordingly, the second calculation section 22 calculates three unknown components from the four known components, that is, the unknown components are uniquely calculated. When the output device uses 7 CMYKRGB colors, since the first calculation section 21 calculates K, R, G and B of the second color signal from the first color signal L*a*b* as described above, the number of unknown quantities becomes three and the number of known quantities becomes seven. Accordingly, the second calculation section 22 can calculate three unknown components from the seven known components.

As described above, the first calculation section 21 obtains the extra colors K or RGB as constraint color components. In this manner, when color components of extra colors are obtained in preference with respect to the basic colors such as CMY, the color components of the extra colors may be obtained with high accuracy. In addition, by using the color conversion model F with high accuracy, when an input color signal and a extra color used to reproduce the input color signal are given, color components of the basic color such as CMY or the like may be also calculated with high accuracy.

Figure 9:
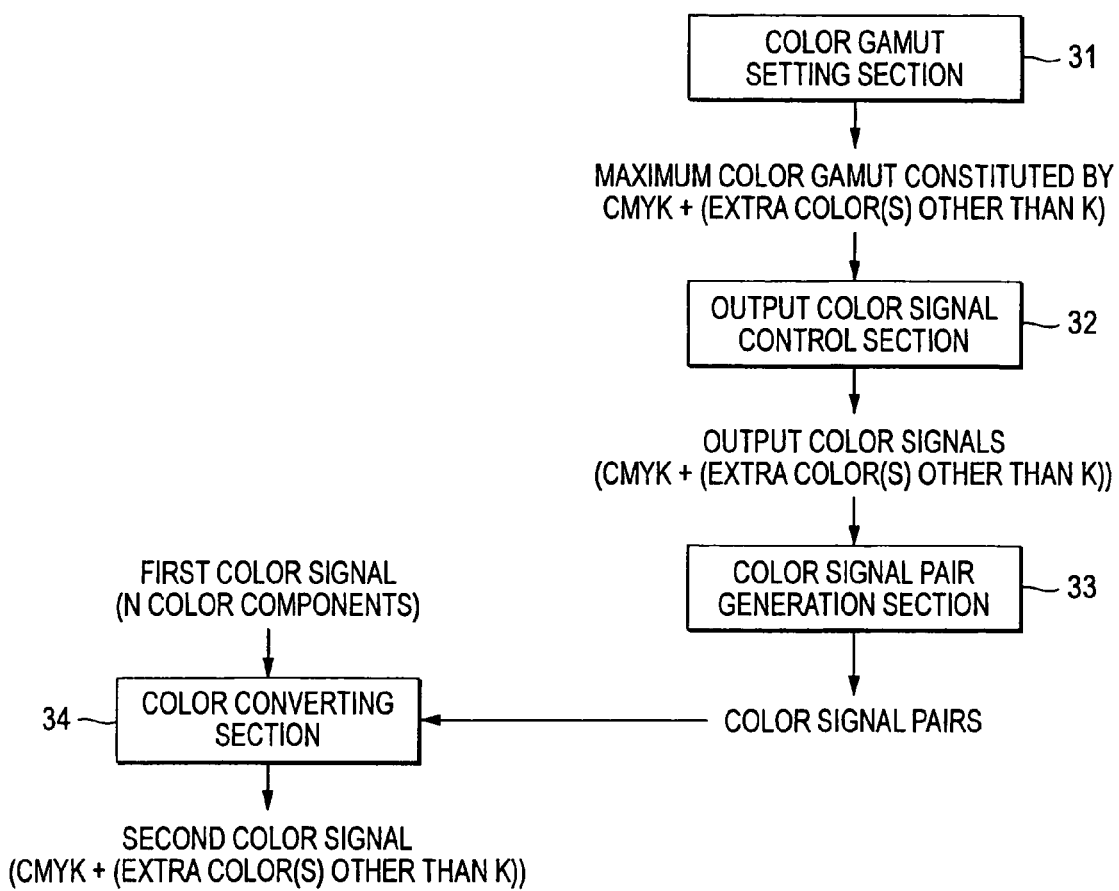
FIG. 9 is a configuration view showing a second exemplary embodiment of the present invention.

FIG. 9 is a configuration view showing a second exemplary embodiment of the present invention. In the figure, reference numeral 31 denotes a color gamut setting section, reference numeral 32 denotes an output color signal control section, reference numeral 33 denotes a color signal pair generation section, and reference numeral 34 denotes a color converting section. The color gamut setting section 31 sets a color gamut constituted by combinations of values of M color components where M is an integer equal to or larger than 5. The M color components include three basic color components and two or more extra color components (in this exemplary embodiment, M is in a range of 5 to 7). Each combination of the values of the M color components constituting the color gamut has maximum values of the extra color components among combinations of values of the M color components that provide a target color by an output device that outputs a color using M colors. Also, as described in the first exemplary embodiment, a color gamut may be set to meet various predetermined limitations such as a limitation that a total sum of values of the M color components falls within a total amount limitation or a one color max value limitation to be met by a value of each color component. A color gamut set by the color gamut setting section 31 is the widest color gamut for the case where extra colors are used among all color gamuts reproduced by the output device.

The output color signal control section 32 controls combinations of M color components, each of which provides a color within the color gamut set by the color gamut setting section 31, to obtain output color signals having the M color components as its elements. The control is performed between a combination having a minimum total sum of values of the M color components among combinations of values of the M color components, which provide a color within the color gamut, and a combination having a maximum total sum of values of the M color components among the combinations of the values of the M color components, which provide the color within the color gamut. If a predetermined limitation is imposed, the control is performed so that the imposed limitation is met.

The color signal pair generation section 33 generates pairs of the output color signals, which are obtained by the output color signal control section 32, and input color signals which are in an input color space and represent colors corresponding to the output color signals. The pairs of input color signal and output color signal may be generated based on colors which are uniformly arranged in an inside and an outline of the color gamut set by the color gamut setting section 31. As described above, the number N of color components of the input color signal<the number M of color components of the output color signal. Therefore, an output color signal is not uniquely determined from an input color signal. However, input color signals corresponding to output color signals are uniquely determined, respectively, and the pairs therebetween are generated.

The color converting section 34 performs color conversion of a first color signal in the input color space into a second color signal in the output color space based on the plural pairs of an output color signal and an input color signal, which are generated by the color signal pair generation section 33. For example, a color conversion model may be generated based on the plural pairs of output color signal and input color signal, and conversion of the first color signal into the second color signal may be performed using the color conversion model. In this case, the color converting section 34 has the same configuration as one shown in FIG. 8. Alternatively, the plural pairs of output color signal and input color signal may be used as a conversion table, and conversion of the first color signal into the second color signal may be performed in combination with an interpolation operation. Of course, another converting method may be employed.

Also, the second exemplary embodiment may be configured without the color converting section 34 so that the plural pairs of output color signal and input color signal generated by the color signal pair generation section 33 are output or that a color conversion model is generated and output based on the plural pairs of output color signal and input color signal. In this case, the color converting section 34, which performs color conversion using the plural pairs of output color signal and input color signal or the color conversion model generated based on the plural pairs of output color signal and input color signal, may be configured as a separate device.

The above configuration of the second exemplary embodiment of the present invention will be further described in detail below. In the second exemplary embodiment of the present invention, a color gamut is expanded by also applying the color gamut generation method shown in the above-described first exemplary embodiment for not only K but also an extra color(s) other than K. As described in the first exemplary embodiment, the widest color gamut is obtained by generating a color gamut in which total sums of values of color components are minimized. As the color gamut setting section 31 obtains combinations of color components each having maximum values of extra colors to make a total sum of values of the color components minimum, and thereby, the widest color gamut is obtained.

Figure 10:
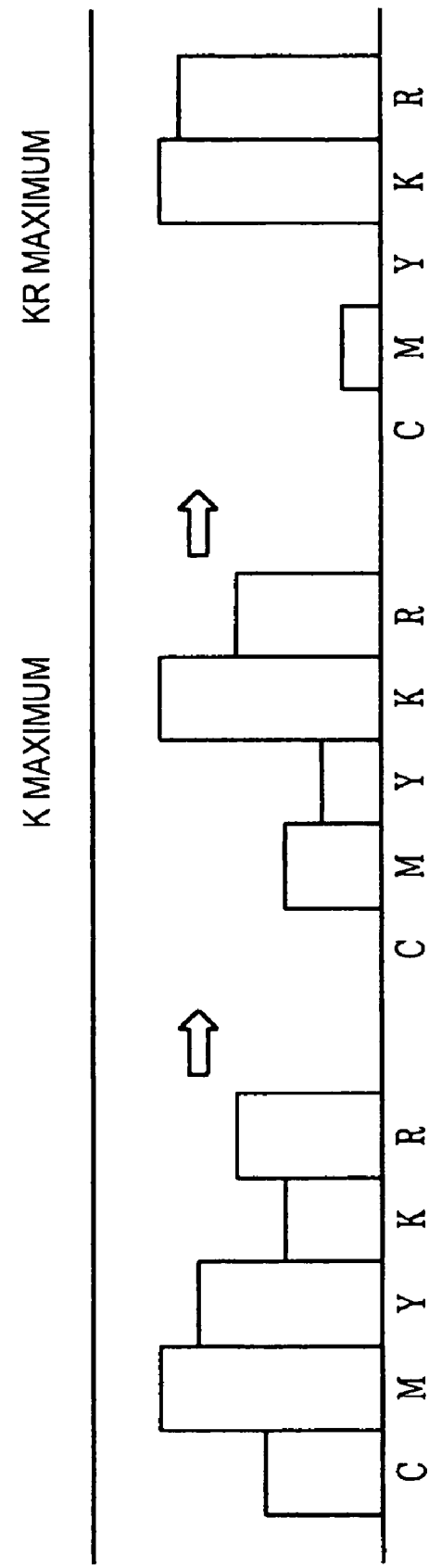
FIGS. 10A to 10C are explanatory views showing examples of obtaining a combination of M colors that minimizes a total sum and maximizes extra colors.

FIGS. 10A to 10C are explanatory views showing an example of obtaining a combination of M colors having maximum values of extra colors and a minimum total sum. In the figures, five CMYKR colors are used, and an example is shown where each CMY color is substituted with K and R using an UCR method for the purpose of simplicity. Here, K is an extra color used to expand a color gamut toward a low lightness side of a color gamut expressed by CMY, and R is an extra color used to expand saturation in a region expressed by MY. Accordingly, by using both K and R, a color gamut can be expanded to the low lightness side and the saturation side in the red color direction.

FIG. 10A shows an example of CMYKR representing one target color. FIG. 10B shows the case where CMY are decreased by the same amount and K is increased the same amount. FIG. 10C shows the case where MY are decreased by the same amount and R is increased the same amount from the combination shown in FIG. 10B. In this example, the combination of CMYKR shown in FIG. 10C is a combination in which the extra colors K and R are maximized and the total sum of CMYKR is minimized.

FIGS. 11A to 11F are explanatory views showing an example of a color gamut generating method performed by the color gamut setting section 31 according to the second exemplary embodiment of the present invention. The color gamut setting section 31 sets a color gamut by obtaining combinations of CMYKR with maximal substitution by K and/or R as described above. Accordingly, as shown in FIG. 11A, first, a color gamut is generated with four CMYK colors (R=0) with K being used maximally. This color gamut corresponds to the color gamut shown in FIG. 3A in the first exemplary embodiment.

Next, a color gamut is generated with five CMYKR colors with R=100 for a region of C=0 (R=100 when C=0). A hatched region in FIG. 11B is a region of colors which can be reproduced even if C=0 out of all the color gamut of the four colors shown in FIG. 11A. Colors in this region has R=0 when the color gamut of the four colors of FIG. 11A is obtained. R is changed from 0 to 100 for the combination of CMYKR (C=0 and R=0) representing the colors in this region of C=0. A hatched region in FIG. 11C is a region of colors reproduced by combinations of CMYKR (C=0) obtained by such change.

In addition, R is being changed between R=0 shown in FIG. 11B and R=100 shown in FIG. 11C. This state is shown in FIG. 11D. For example, R may be decreased from an outline of the cube (see FIG. 11E) of R=100 shown in FIG. 11C. Alternatively, R may be increased from an outline of the color gamut of C=0 and R=0 shown in FIG. 11B. In this manner, a color gamut (color gamut maximizing K and R) of five CMYKR colors shown in FIG. 11F is generated. The color gamut in which K and R are used maximally is a color gamut in which a total sum of color components is minimized when five CMYKR colors are used.

Various limitations described in the first exemplary embodiment are not considered in the above description. If a limitation is imposed, a portion which does not meet the limitation may be deleted from the obtained color gamut. For example, if a limitation (total amount limitation) is imposed on a total sum of color components, it is determined whether or not the total sum of each combination of CMYKR in the case where K and R are maximally used meets the total amount limitation. If the total amount does not meet the total amount limitation, the combination of CMYKR may be deleted.

Figure 13:
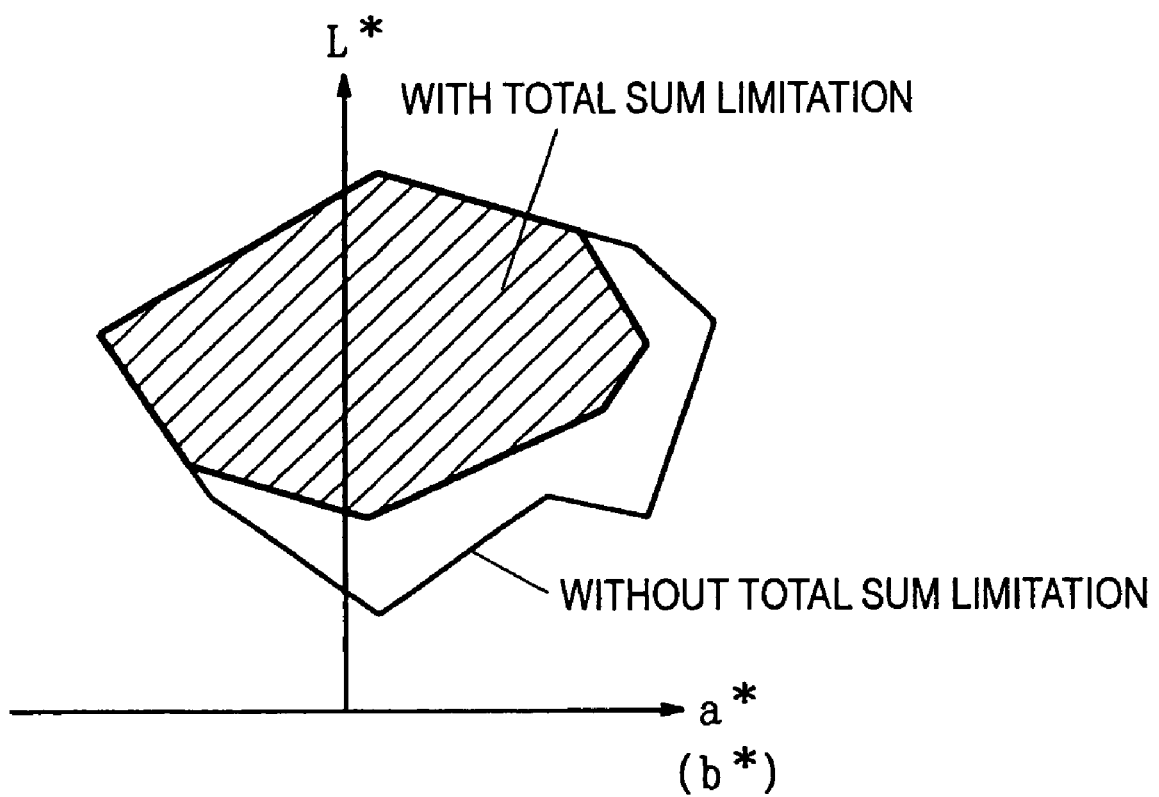
FIG. 13 is an explanatory view of an example of the widest color gamut, which meets a total CMYKR amount limitation.

FIG. 12 is an explanatory view showing an example of a process of selecting a combination of CMYKR which uses K and R maximally with a total sum limitation. FIG. 13 is an explanatory view showing an example of the widest color gamut meeting a total amount limitation regarding CMYKR. FIG. 12 shows an example where a limitation that a total sum is within 280% is imposed. This figure shows a total sum of each combination of CMYKR which use K and R maximally, and a determination as to whether or not each combination of CMYKR can be extracted by checking if the limitation is met. For example, when (C, M, Y, K, R)=(0, 80, 50, 20, 10), the combination of CMYKR is to be extracted because its total sum is 160%. As another example, when (C, M, Y, K, R)=(0, 90, 80, 90, 100), the combination of CMYKR is to be deleted from a color gamut without being extracted because its total sum is 360%. In this manner, when combinations of CMYKR meeting the total sum limitation are extracted from among the combinations of CMYKR which use K and R maximally, the widest color gamut meeting the set total sum limitation is obtained. If a color gamut is expressed in the L*a*b* color space, for example, the color gamut is indicated by a hatched region in FIG. 13. In addition, a color gamut indicated by a solid line in the outside of the color gamut indicated by the hatched region corresponds to a color gamut in which a total sum limitation shown in FIG. 11F is not imposed.

For the case where another limitation is imposed, by extracting combinations of CMYKR meeting the other limitation from the combinations of CMYKR which use K and R maximally, the widest color gamut meeting the other limitation is obtained.

In this manner, in the case where CMYKR is used, when the widest color gamut is secured, it is guaranteed that there exist one or more combinations of CMYKR for each color within the color gamut. The output color signal control section 32 selects one of the existing one or more combinations of CMYK.

Figure 11:
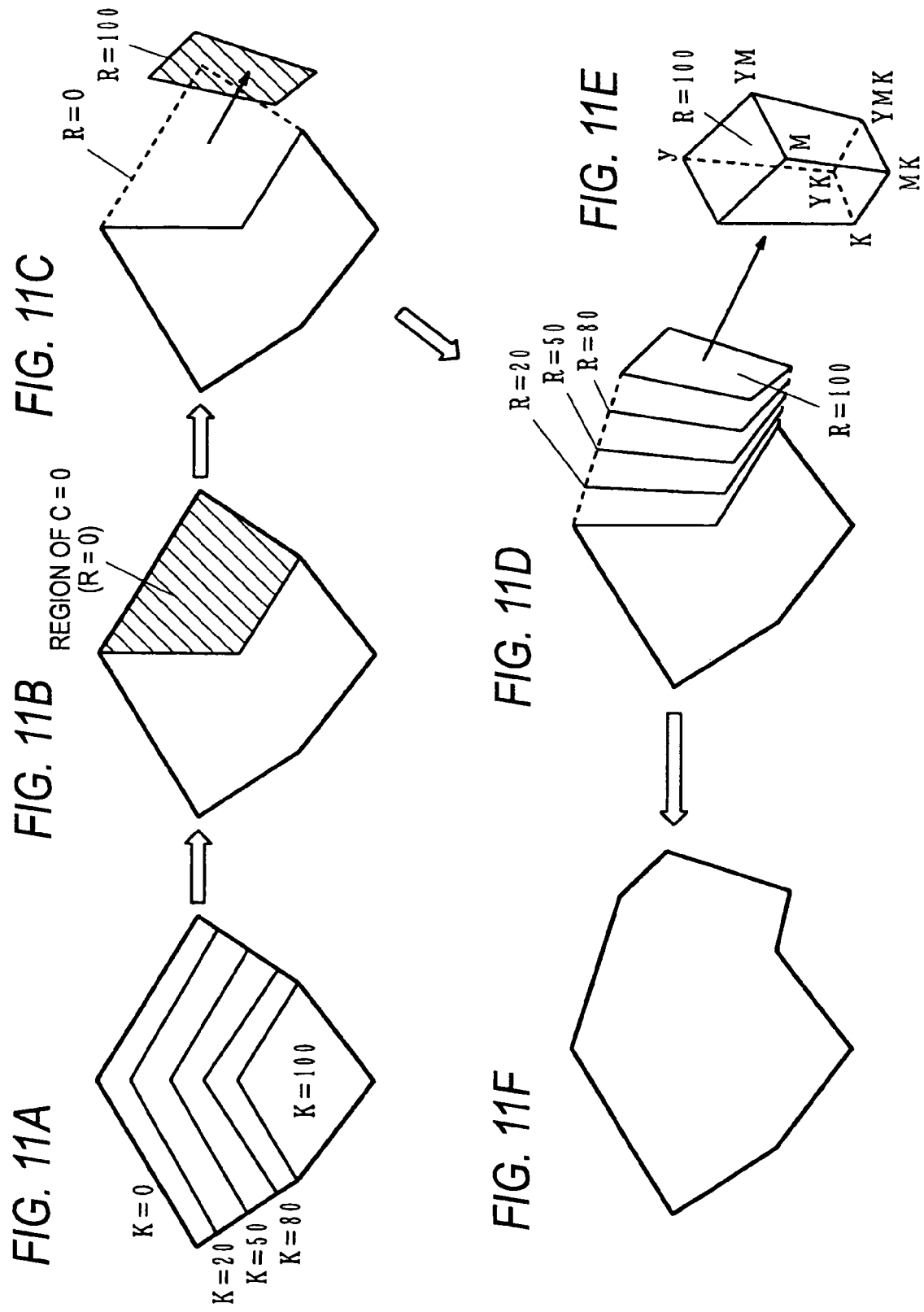
FIGS. 11A to 11F are explanatory views showing an example of a color gamut generating method performed by a color gamut setting section 31 according to the second exemplary embodiment of the present invention.
Figure 14:
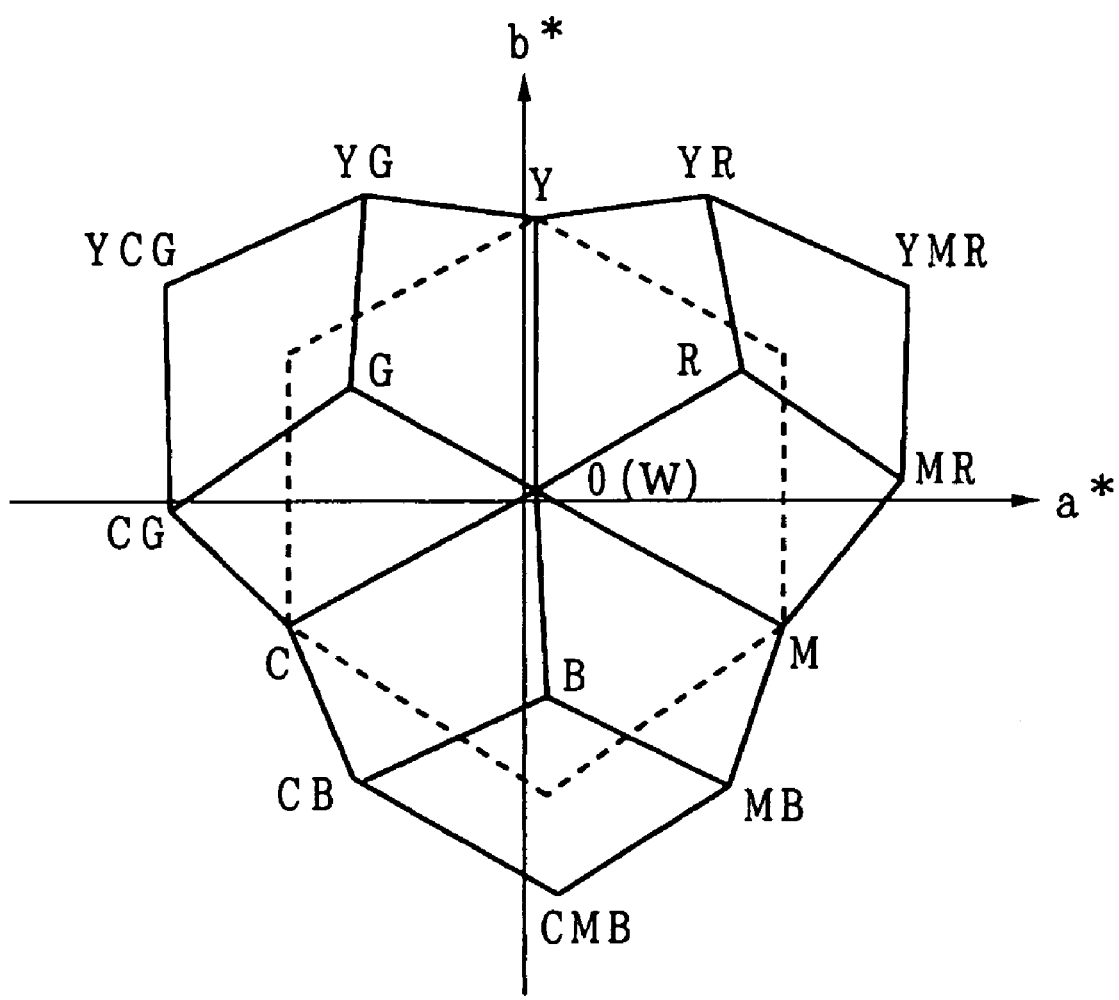
FIG. 14 is an explanatory view of an example of the widest color gamut when CMYKRGB is used.

FIG. 14 is an explanatory view showing an example of the widest color gamut when CMYKRGB is used. FIG. 11 shows five CMYKR colors. For example, in the case where CMYKRGB is used, color gamut may be expanded by using G and B along with R. In cases where seven CMYKRGB colors exist, since R, G and B are overlapped with each other, it may be considered that these colors are divided into CMYKR, CMYKG and CMYKB. The method of expanding a color gamut by using R may be used as it is, G may be changed from 0 to 100 for a region of M=0, and B may be changed from 0 to 100 for a region of Y=0. FIG. 14 shows a color gamut obtained in this manner. FIG. 14 shows outlines of color gamut viewed from a larger value of L* in the L*a*b* color space.

Of course, the second exemplary embodiment is not limited to CMYKR and CMYKRGB. In the case where CMYKRG or another extra color are used, a color gamut may be set by applying to each extra color the above-described method used for R.

Figure 15A:
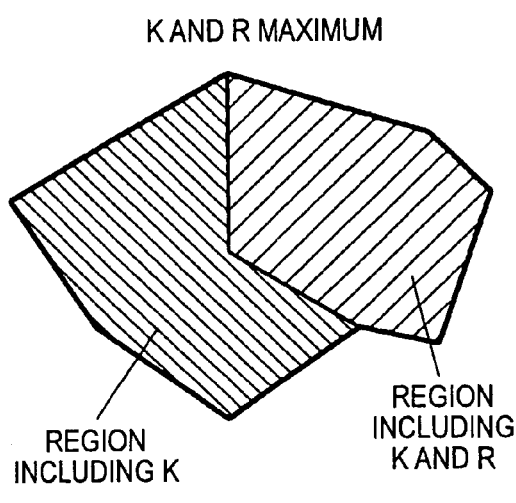
FIGS. 15A and 15B are explanatory views showing examples of a range of combination of CMYKR in a color gamut.
Figure 15B:
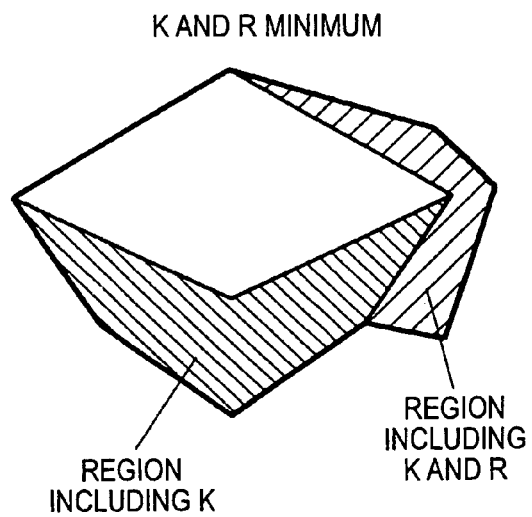

FIGS. 15A and 15B are explanatory views showing an example of a range of combinations of CMYKR in a color gamut. For example, if no limitation is imposed, a combination of CMYKR to reproduce a certain color in a color gamut may be selected between a combination having a minimum total sum and a combination having a maximum total sum. On the other hand, if any limitation is imposed, a combination of CMYKR may be selected between a combination having a minimum total sum and a combination which is equal to an upper limit of the limitation. FIGS. 15A and 15B show the case where no limitation is imposed. FIG. 15A shows the case where K and R are used maximally. Focusing on K and R, K is used within a color gamut, and K and R are used within a region of colors which are reproduced where C=0. FIG. 15B shows the case where K and R are used minimally. Here, neither K nor R is used for a region of colors which are reproduced with CMY. There exist a region of colors which are not reproduced unless K is used and a region of colors which are not reproduced unless both K and R are used. In the case where K or R is not used, a use amount of CMY increases for K and a use amount of MY increases for R. Accordingly, FIG. 15B shows the maximum total sum. Of course, there also exists a combination having a middle total sum between the minimum total sum shown in FIG. 15A and the maximum total sum shown in FIG. 15B. In this manner, one or more combinations of CMYKR exist in the color gamut set by the color gamut setting section 31, and the combinations of CMYKR may be controlled within this range.

As one example, one of combinations of CMYKR having a maximum total sum is assumed as:

$(C,M,Y,K,R)=(0,0,50,30,30)$

In the combination having a minimum total sum, one out of CMY is 0. This combination of CMYKR may be controlled using the UCR principle toward the maximum total amount color gamut, as follows. First, replacement of R with YM gives:

$(C,M,Y,K,R)=(0,30,80,30,0)$

In addition, replacement of K with CMY gives:

$(C,M,Y,K,R)=(20,50,100,10,0)$

CMYKR may be controlled in a range having the combination of CMYK (C, M, Y, K, R)=(0, 0, 50, 30, 30) having the minimum total sum and the combination of CMYK (C, M, Y, K, R)=(20, 50, 100, 10, 0) having the maximum total sum, which are obtained in this manner, as their respective upper and lower limits. For colors in an outside of the color gamut, CMYKR may be controlled in a similar way.

Examples of the control method may include various control methods such as a control method of minimizing the total sum, a control method of maximizing the total sum (if a limitation is imposed, the limitation is met), a control method of increasing K as a grey axis approaches and decreasing K as a saturation increases, etc. For color gamut expansion to increase saturation with an extra color such as RGB, the extra color may be controlled to increase as the saturation increases.

Regardless of which control method is taken, if values of K and R are not within a range having (i) KR in which the total sum is minimized (K and R are maximized) and (ii) KR in which the total sum is maximized (K and R are minimized) as their respective upper and lower limits, colors in the color gamut cannot be reproduced. Of course, depending on which out of K and R is first determined, the one determined later is limited. Regardless of which precedes, extra colors have to be controlled within a range having a combination in which the total sum is minimized and a combination in which the total sum is maximized as their respective upper and lower limits.

Figure 16A:
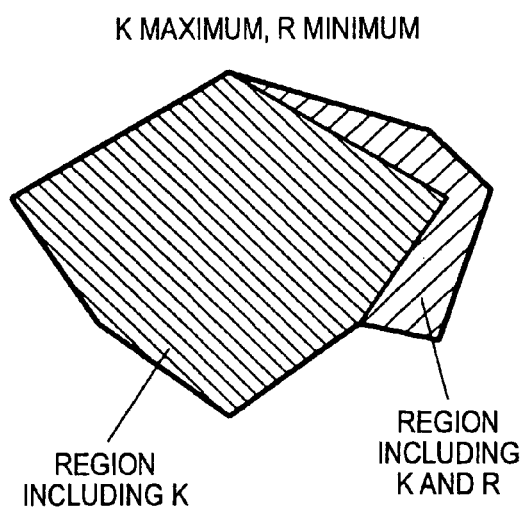
FIGS. 16A and 16B explanatory views showing examples of a control method of K and R when CMYKR is used.
Figure 16B:
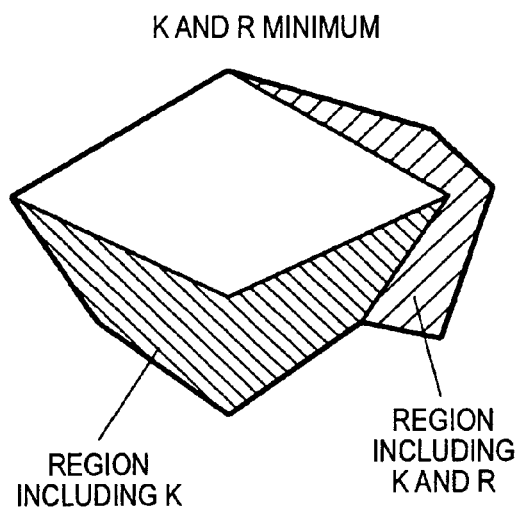

FIGS. 16A and 16B are explanatory views showing an example of a control method of K and R when CMYKR is used. This example shows the case where K is controlled so as to be minimized. In a color gamut set by the color gamut setting section 31, a region of colors which use K but don't use R and a region of colors which use both K and R are indicated by different hatchings. FIG. 16A shows the case where K is used maximally, and FIG. 16B shows the case where K is used minimally. Since it is determined that R is used minimally in this example, K is controlled in a range which can be taken by K under this condition.

Alternatively, R may be first determined to be maximized, and K may be controlled in a range which can be taken by K under this condition. Or, conversely, K may be first determined to be maximized or minimized, and R may be controlled in a range which can be taken by R under this condition. Of course, both of K and R are not limited to the maximum or the minimum. It goes without saying that one of K and R may be controlled to be between the maximum and the minimum, and the other may be controlled under this condition.

In addition, for example, the above-described control may be applied to cases other than CMYKR. For example, the color gamut shown in FIG. 14 is obtained when CMYKRGB is used. As described above, R, G and B may be considered to be independent of each other. Therefore, K and G and K and B may be controlled using the above-described control method for K and R for the color gamut shown in FIG. 14. In addition, although FIGS. 15A, 15B, 16A and 16B do not consider limitation imposed on the output device, if any limitation is imposed, the range to be controlled may be also controlled to be a range meeting the limitation using a color gamut in the case where the limitations described in FIGS. 12 and 13 are imposed.

Figure 17:
FIG. 17 is an explanatory view of an example of pairs of output color signals and input color signals which are obtained in a color signal pair generation section 33.

When the combinations of color components controlled by the output color signal control section 32 are obtained, the color signal pair generation section 33 takes the obtained combinations of color components as output color signals, obtains input color signals in the input color space corresponding to the output color signals, and generates plural pairs of the output color signal and the input color signal. For example, if the output color signals are CMYKR and the input color signals are color signals in the L*a*b* color space, conversion of CMYKR into L*a*b* is performed. This conversion may be performed using, for example, a model extended to CMYKRG for the above equation 1. In this example, input color signals are uniquely determined because this example is the five-dimension to three-dimension conversion. FIG. 17 is an explanatory view showing an example of pairs of output color signal and input color signal, which are obtained by the color signal pair generation section 33. For example, an output color signal (C0, M0, Y0, K0, R0) may correspond to an input color signal (L0, a0, b0) which is obtained by converting this output color signal. Such a pair of an output color signal and an input signal is generated for each output color signal obtained by the output color signal control section 32.

The color converting section 34 performs color conversion of a first color signal in the input color space (L*a*b* color space) into a second color signal in the output color space (CMYKR color space) using the plural pairs of the output color signal (here CMYKR) and the input color signal (here L*a*b*), which are obtained in the color signal pair generation section 33. For example, conversion of the first color signal into the second color signal may be performed using the pairs of the output color signal and the input color signal shown in FIG. 17 as a conversion table in combination with an interpolation operation. Alternatively, for example, a color conversion model may be generated based on the plural pairs of the output color signal and the input color signal, and conversion of the first color signal into the second color signal may be performed using the generated color conversion model. In this case, the color converting section 34 may use the configuration shown in FIG. 8. In this case, if the output color signal is CMYKR, the first calculation section 21 generates a model from the input color signals and K of the output color signals based on the pairs of the output color space and the input color signal, which are obtained by the color signal pair generation section 33, and calculates K from the first color signal L*a*b* based on the model. Simultaneously, the first calculation section 21 generates a model from the input color signals and R of the output color signals, and calculates R from the first color signal L*a*b* based on the model. In addition, the second calculation section 22 may calculate the remaining CMY from K, R obtained by the first calculation section 21 and the first color signal L*a*b*. The second color signal is obtained from K and R obtained by the first calculation section 21 and CMY obtained by the second calculation section 23.

Figure 18:
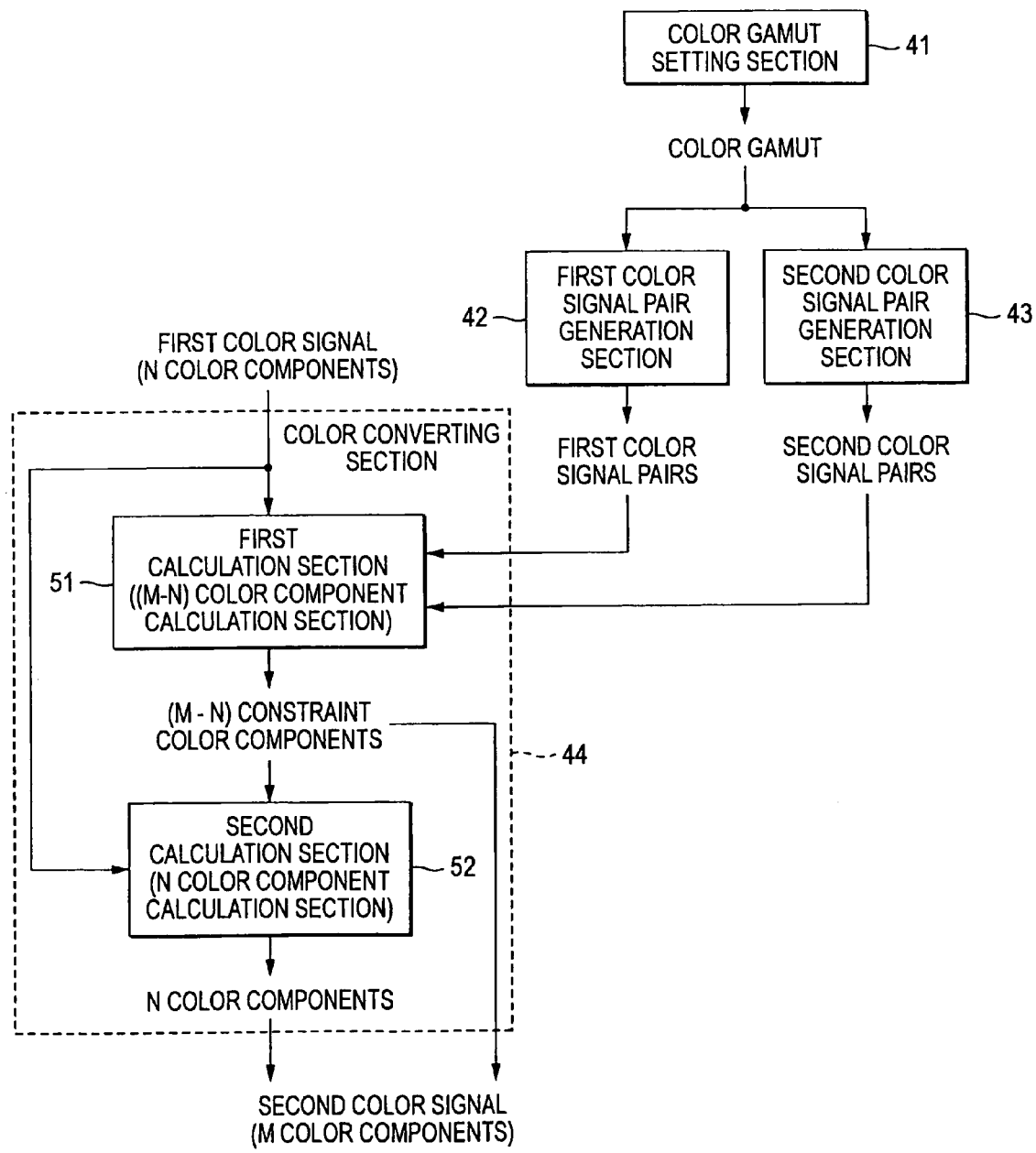
FIG. 18 is a configuration view showing a third exemplary embodiment of the present invention.

FIG. 18 is a configuration view showing a third exemplary embodiment of the present invention. In the figure, reference numeral 41 denotes a color gamut setting section, reference numeral 42 denotes a first color signal pair generation section, reference numeral 43 denotes a second color signal pair generation section, reference numeral 44 denotes a color converting section, reference numeral 51 denotes a first calculation section ((M−N) color component calculation section), and reference numeral 52 denotes a second calculation section (N color component calculation section). The third exemplary embodiment shows an example where combinations which are upper and lower limits of a total sum for combinations of values of M color components representing a certain color within a set color gamut are obtained, a pair of the combination of the upper limit and an input color signal and a pair of the combination of the lower limit and another input color signal are generated, and values of upper and lower limits for (M−N) color components of a second color signal are obtained from a first color signal, and a control is performed between the obtained upper and lower limits.

The color gamut setting section 41 sets a color gamut constituted by combinations of values of M color components. Each combination of the values of the M color components constituting the color gamut has a minimum total sum of the values of the M color components among combinations of values of the M color components that provide a target color by an output device that outputs a color using M colors. If a limitation is imposed on the output device, a color gamut is set in a range where this imposed limitation is met. In addition, the color gamut setting section 41 may be configured by the color gamut setting section 11 in the first exemplary embodiment or the color gamut setting section 31 in the second exemplary embodiment.

The first color signal pair generation section 42 takes, as output color signals, combinations each having a minimum total sum among all combinations of values of the M color components, which provide a corresponding one of target colors within the color gamut set by the color gamut setting section 41. Then, the first color signal pair generation section 42 generates first color signal pairs which are pairs of the output color signals and input color signals in an input color space having N(<M) color components as its elements and corresponding to the output color signals.

The second color signal pair generation section 43 takes, as output color signals, combinations each of which has a maximum total sum among all combinations of values of the M color components, which provide a corresponding one of target colors within the color gamut set by the color gamut setting section 41. Then, the second color signal pair generation section 43 generates second color signal pairs which are pairs of the output color signals and input color signals which are in the input color space and correspond to the output color signals. In addition, if a limitation is imposed on the output device, the combinations, each of which has a maximum total sum in a range of the imposed limitation, are taken as the output color signals.

The color converting section 44 performs color conversion of a first color signal in the input color space into a second color signal in the output color space based on the first color signal pairs generated by the first color signal pair generation section 42 and the second color signal pairs generated by the second color signal pair generation section 43. Here, the color converting section 44 is configured to include the first calculation section 51 and the second calculation section 52.

The first calculation section 51 calculates (M−N) color components of the second color signal in the output color space from the first color signal in the input color space. At that time, (M−N) color components are calculated based on the plural first color signal pairs generated by the first color signal pair generation section 42, and are taken as first constraint color components. Also, (M−N) color components are calculated based on the plural second color signal pairs generated by the second color signal pair generation section 43, and taken as second constraint color components. Also, values of (M−N) color components are controlled between the first constraint color components and the second constraint color components, so as to calculate the (M−N) color components. In addition, the configuration of calculating (M−N) color components from the first color signal pairs and the configuration of calculating (M−N) color components from the second color signal pairs may use the configuration of the first calculation section 21 shown in FIG. 8.

For example, when CMYK is used as the output color space and L*a*b* is used as the input color space, the first color signal pair generation section 42 obtains pairs of a combination of CMYK in which the total sum is minimized and L*a*b* as the first color signal pairs, and the second color signal pair generation section 43 obtains pairs of a combination of CMYK in which the total sum is maximized (maximum within a range meeting a limitation) and L*a*b* as the second color signal pairs. Accordingly, if a constraint color component is K, the maximum K is obtained based on the first color signal pairs, and the minimum K is obtained based on the second color signal pairs. K may be controlled between the maximum K and the minimum of K. For example, it may be considered that the proportion of K is controlled depending on lightness or saturation.

In addition, if a color other than K is included as an extra color, it may be required that K or one of extra colors other than K is first determined, and the other extra color is determined under the determined condition. Accordingly, for example, if CMYKR is used, it may be configured that R is controlled by the first color signal pair generation section 42 and the second color signal pair generation section 43, and K is controlled by the first calculation section 51. For example, by maximizing R, the first color signal pairs for the case where K is used maximally are generated by the first color signal pair generation section 42, the second color signal pairs for the case where K is used minimally are generated by the second color signal pair generation section 43, and K may be controlled between the maximum K and the minimum K (including the maximum K and the minimum K) which are obtained using the first color signal pairs and the second color signal pairs. Of course, the method of controlling R for the case where the first color signal pair generation section 42 and the second color signal pair generation section 43 respectively generate the first color signal pairs and the second color signal pairs is not limited to using of R maximally, but may be a method of minimizing R or a pre-designed method. In addition, conversely, it may be configured that K is controlled by the first color signal pair generation section 42 and the second color signal pair generation section 43, and R is controlled by the first calculation section 51. In addition, if there exists plural extra colors other than K, for example, in the case of CMYKRGB, for KR, KG and KB, one of them may be controlled by the first color signal pair generation section 42 and the second color signal pair generation section 43, and the others may be controlled by the first calculation section 51.

The second calculation section 52 calculates the N remaining color components of the second color signal based on the first color signal and the (M−N) color components of the second color signal calculated by the first calculation section 51. Accordingly, the second color signal is obtained from the calculated N color components and the (M−N) color components calculated by the first calculation section 51. In addition, the second calculation section 52 may be configured by, for example, the second calculation section 22 shown in FIG. 8.

Figure 19:
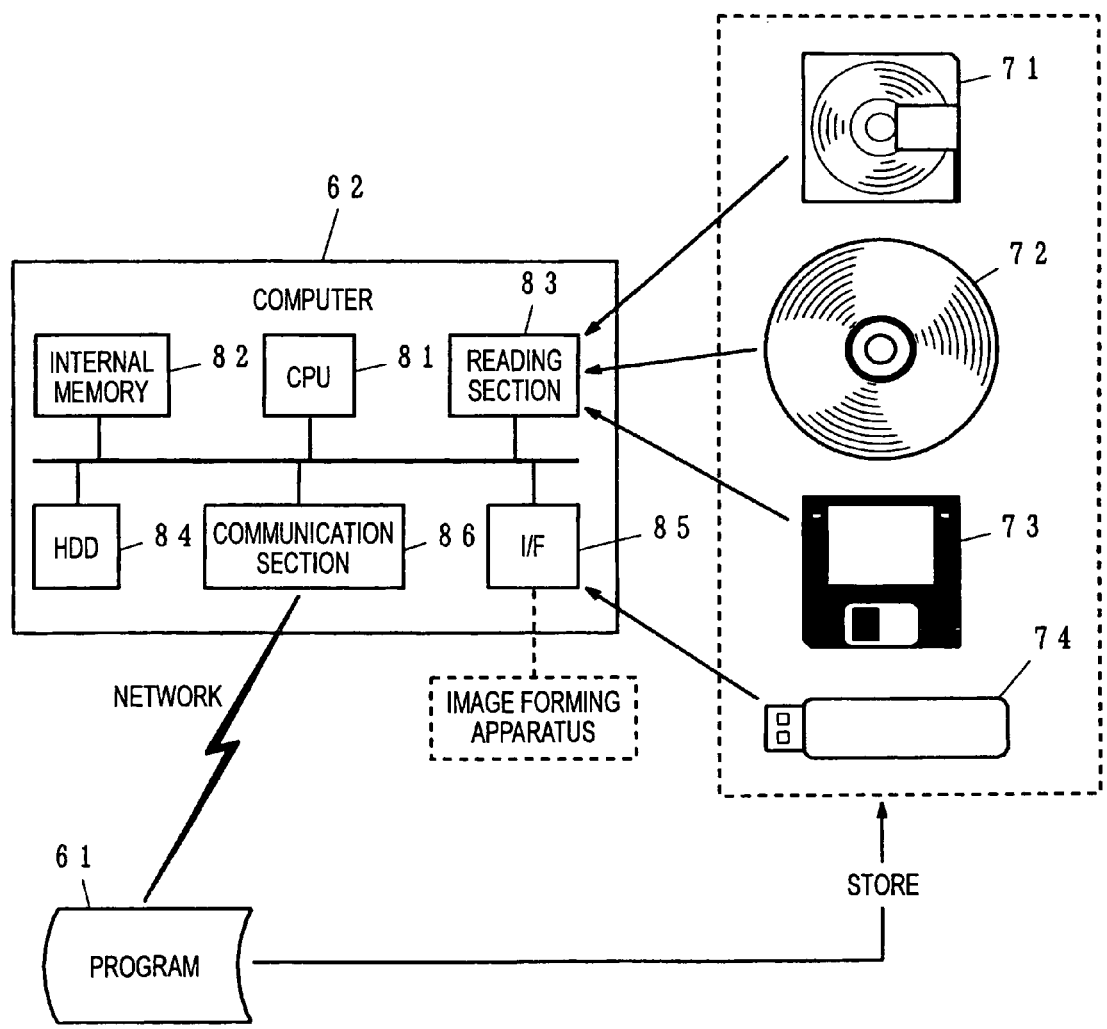
FIG. 19 is an explanatory view of an example of a computer program, a storage medium storing the computer program, and a computer when functions described in various exemplary embodiments of the present invention are implemented by the computer program.

FIG. 19 is an explanatory view of an example of a computer program, a storage medium having the computer program stored therein, and a computer when functions described in various exemplary embodiments of the present invention are implemented by the computer program. In the figure, reference numerals 61, 62, 71, 72, 73, 74, 81, 82, 83, 84, 85 and 86 respectively denote a program, a computer, a magneto-optical disk, an optical disk, a magnetic disk, a memory, a CPU, an internal memory, a reading section, a hard disk, an interface and a communication section.

All or some of the functions of various parts described in the above embodiments of the present invention may be implemented by the program 61 executable by a computer. In this case, the program 61 and data used by the program etc. may be stored in a computer readable storage medium. A storage medium is to cause changes of energy such as magnetism, light, electricity, etc., according to the description contents of a program for the reading section 83 provided in a hardware resource of a computer and deliver the contents of description of the program to the reading section 83 in the form of a signal corresponding to the change of energy. For example, the storage medium may include the magneto-optical disk 71, the optical disk 72 (including CD, DVD, etc.), the magnetic disk 73, the memory 74 (including an IC card, a memory card, etc.), etc. Of course, these storage media are not limited to a transportable type.

By storing the program 61 in the storage media and loading the storage media into, for example, the reading section 83 or the interface 85 of the computer 62 and also by reading the program 61 from the computer, storing the program in the internal memory 82 or the hard disk 84 and executing the program 61 by the CPU 81, all or some of the functions described in the above embodiments of the present invention can be implemented. Alternatively, the functions may be implemented by transmitting the program 61 to the computer 62 via a communication path, receiving the program 61 in the communication section 86 of the computer 62, storing it in the internal memory 82 or the hard disk 84, and executing the program 61 by the CPU 81.

In addition, the computer 62 may be connected to other various devices via the interface 85. For example, the computer 62 may be connected to a display device for displaying information, a receiving device for receiving information from users, etc. In addition, for example, it may be configured that the computer 62 is connected to an image forming apparatus as an output device via the interface 85 and an image is formed in the image forming apparatus by using a second color signal. Further, elements are not required to be operated in one computer but may be executed in different computers according to process steps. For example, a process of creating a color signal pair, a process of converting a first color signal, a process of creating a model from the color signal pair, etc. may be performed in different computers.

What is claimed is:

1. A color processing apparatus comprising:
   a color gamut setting unit that sets a color gamut constituted by combinations of values of M color components where M is an integer equal to or larger than 4, wherein
      each combination of the values of the M color components constituting the color gamut has a minimum total sum of the values of the M color components among combinations of values of the M color components that provide a corresponding one of target colors by an output device that outputs a color using M colors, and
      each combination of the values of the M color components meets a predetermined limitation;
   a signal control unit that obtains output color signals each having values of the M color components as elements by controlling, within a range meeting the predetermined limit, combinations of values of the M color components each of which provide any of colors within the color gamut set by the color gamut setting unit; and
   a color signal pair generation unit that generates pairs each having (i) a corresponding one of the output color signals obtained by the signal control unit and (ii) an input color signal which is in an input color space, corresponds to the corresponding one of the output color signals, represents a color within the set color gamut, and has values of N color components as elements where N is an integer smaller than M.

2. The color processing apparatus according to claim 1, wherein
   the signal control unit controls combinations of values of the M color components within a range of (i) the combinations each having the minimum total sum of the values of the M color components among combinations of values of the M color components providing a corresponding one of the colors within the color gamut set by the color gamut setting unit, and (ii) combinations each having a maximum total sum of the values of the M color components among combinations of values of the M color components meeting the predetermined limitation and providing a corresponding one of the colors within the color gamut set by the color gamut setting unit.

3. The color processing apparatus according to claim 1, further comprising:
   a color converting unit that performs color conversion of a first color signal in the input color space into a second color signal in an output color space based on the plural pairs of the output color signal and the input color signal, which are generated by the color signal pair generation unit.

4. The color processing apparatus according to claim 3, wherein
   the color converting unit includes
      a first calculation unit that calculates values of (M−N) color components of the second color signal in the output color space based on (i) the first color signal in the input color space and (ii) the plural pairs of the output color signal and the input color signal, which are generated by the color signal pair generation unit, and a second calculation unit that calculates values of N remaining color components of the second color signal based on the first color signal and the (M−N) color components of the second color signal calculated by the first calculation unit.

5. The color processing apparatus according to claim 1, wherein the predetermined limitation includes a limitation that a total sum of values of the M color components is within a total amount limitation imposed on the output device.

6. The color processing apparatus according to claim 1, wherein the predetermined limitation includes a limitation that each of values of the M color components is within a one color max value limitation for each of the M color component imposed on the output device.

7. A color processing apparatus comprising:
 a color gamut setting unit that sets a color gamut constituted by combinations of values of M color components where M is an integer equal to or larger than 4, wherein
  each combination of the values of the M color components constituting the color gamut has a minimum total sum of the values of the M color components among combinations of values of the M color components that provide a corresponding one of target colors by an output device that outputs a color using M colors, and
  each combination of the values of the M color components meets a predetermined limitation;
 a first color signal pair generation unit that generates first color signal pairs each including (i) an output color signal having values of the M color components as elements, the output color signal having a minimum total sum of the values of the M color components among combinations of values of the M color components that provide one color in the color gamut set by the color gamut setting unit, and (ii) an input color signal which is in an input color space, corresponds to the output color signal and has values of N color components as elements where N is an integer smaller than M;
 a second color signal pair generation unit that generates second color signal pairs each including (i) an output color signal having values of the M color components as elements, the output color signal having a maximum total sum of the values of the M color components among combinations of values of the M color components that provide one color in the color gamut set by the color gamut setting unit and meet the predetermined limitation, and (ii) an input color signal which is in the input color space and corresponds to the output color signal;
 a first calculation unit that
  calculates, as first constraint color components, values of (M−N) color components of a second color signal in the output color space based on (i) a first color signal in the input color space and (ii) the plural first color signal pairs generated by the first color signal pair generation unit,
  calculates, as second constraint color components, values of the (M−N) color components of the second color signal in the output color space based on (i) the first color signal in the input color space and (ii) the plural second color signal pairs generated by the second color signal pair generation unit, and
  calculates values of the (M−N) color components of the second color signal by controlling the values of the color components in a range of the first constraint color components and the second constraint color components; and a second calculation unit that calculates N remaining color components of the second color signal based on the first color signal and the values of the (M−N) color components of the second color signal calculated by the first calculation unit.

8. The color processing apparatus according to claim 7, wherein the values of the (M−N) color components of the second color signal are (i) values of color components to improve granularity of an image output by the output device or (ii) values of color components to expand a color gamut to be reproduced by the output device.

9. A color processing apparatus comprising:
 a color gamut setting unit that sets a color gamut constituted by combinations of values of M color components where M is an integer equal to or larger than 5, wherein the M color components include three basic color components and two or more extra color components, and
  each combination of the values of the M color components constituting the color gamut has maximum values of the extra color components among combinations of values of the M color components that provide a corresponding one of target colors by an output device that outputs a color using M colors,
 a signal control unit that obtains output color signals each having values of the M color components as elements by controlling combinations of values of the M color components each of which provide any of colors within the color gamut set by the color gamut setting unit; and
 a color signal pair generation unit that generates pairs each having (i) a corresponding one of the output color signals obtained by the signal control unit and (ii) an input color signal which is in an input color space, corresponds to the corresponding one of the output color signals, represents a color within the set color gamut, and has values of N color components as elements where N is an integer smaller than M.

10. The color processing apparatus according to claim 9, wherein
 the signal control unit controls combinations of values of the M color components within a range of (i) the combinations each having the minimum total sum of the values of the M color components among combinations of values of the M color components providing a corresponding one of the colors within the color gamut set by the color gamut setting unit, and (ii) combinations each having a maximum total sum of the values of the M color components among combinations of values of the M color components providing a corresponding one of the colors within the color gamut set by the color gamut setting unit.

11. The color processing apparatus according to claim 9, wherein
 the color gamut setting unit sets the color gamut constituted by the combinations of the values of the M color components, which meet a predetermined limitation, each combination of the values of the M color components constituting the color gamut having the maximum values of the extra color components among the combinations of the values of the M color components that provide the corresponding one of the target colors, and
 the signal control unit controls combinations of values of the M color components within a range of (i) the combinations each having the minimum total sum of the values of the M color components among combinations of values of the M color components providing a corresponding one of the colors within the color gamut set by the color gamut setting unit, and (ii) combinations each having a maximum total sum of the values of the M color components among combinations of values of the M color components meeting the predetermined limitation and providing a corresponding one of the colors within the color gamut set by the color gamut setting unit.

12. The color processing apparatus according to claim 11, wherein the limitation includes a limitation that a total sum of values of the M color component values is within a total amount limitation imposed on the output device.

13. The color processing apparatus according to claim 11, wherein the limitation includes a limitation that each of values of the M color components is within a one color max value limitation for each of the M color component imposed on the output device.

14. The color processing apparatus according to claim 9, further comprising:
  a color converting unit that performs color conversion of a first color signal in the input color space into a second color signal in an output color space based on the plural pairs of the output color signal and the input color signal, which are generated by the color signal pair generation unit.

15. The color processing apparatus according to claim 14, wherein
  the color converting unit includes
    a first calculation unit that calculates values of (M−N) color components of the second color signal in the output color space based on (i) the first color signal in the input color space and (ii) the plural pairs of the output color signal and the input color signal, which are generated by the color signal pair generation unit, and
    a second calculation unit that calculates values of N remaining color components of the second color signal based on the first color signal and the (M−N) color components of the second color signal calculated by the first calculation unit.

16. The color processing apparatus according to claim 15, wherein the (M−N) color components of the second color signal are the extra color components.

17. A color processing apparatus comprising:
  a color gamut setting unit that sets a color gamut constituted by combinations of values of M color components where M is an integer equal to or larger than 5, wherein
    the M color components includes three basic color components and two or more extra color components, and
    each combination of the values of the M color components constituting the color gamut has maximum values of the extra color components among combinations of values of the M color components that provide a corresponding one of target colors by an output device that outputs a color using M colors,
  a first color signal pair generation unit that generates first color signal pairs each including (i) an output color signal having values of the M color components as elements, the output color signal having a minimum total sum of the values of the M color components among combinations of values of the M color components that provide one color in the color gamut set by the color gamut setting unit, and (ii) an input color signal which is in an input color space, corresponds to the output color signal and has values of N color components as elements where N is an integer smaller than M;
  a second color signal pair generation unit that generates second color signal pairs each including (i) an output color signal having values of the M color components as elements, the output color signal having a maximum total sum of the values of the M color components among combinations of values of the M color components that provide one color in the color gamut set by the color gamut setting unit, and (ii) an input color signal which is in the input color space and corresponds to the output color signal;
  a first calculation unit that
    calculates, as first constraint color components, values of (M−N) color components of a second color signal in the output color space based on (i) a first color signal in the input color space and (ii) the plural first color signal pairs generated by the first color signal pair generation unit,
    calculates, as second constraint color components, values of the (M−N) color components of the second color signal in the output color space based on (i) the first color signal in the input color space and (ii) the plural second color signal pairs generated by the second color signal pair generation unit, and
    calculates values of the (M−N) color components of the second color signal by controlling the values of the color components in a range of the first constraint color components and the second constraint color components; and
  a second calculation unit that calculates N remaining color components of the second color signal based on the first color signal and the values of the (M−N) color components of the second color signal calculated by the first calculation unit.

18. The color processing apparatus according to claim 17, wherein
  the color gamut setting unit sets the color gamut constituted by the combinations of the values of the M color components, which meet a predetermined limitation, each combination of the values of the M color components constituting the color gamut having the maximum values of the extra color components among the combinations of the values of the M color components that provide the corresponding one of the target colors, and
  the second color signal pair generation unit generates the second color signal pairs each including (i) the output color signal having the values of the M color components as elements, the output color signal having the maximum total sum of the values of the M color components among the combinations of the values of the M color components that meet the predetermined limitation and provide one color in the color gamut set by the color gamut setting unit, and (ii) the input color signal which is in the input color space and corresponds to the output color signal.

19. A non-transitory computer-readable medium storing a program that causes a computer to execute color processing, the color processing comprising:
  setting a color gamut constituted by combinations of values of M color components where M is an integer equal to or larger than 4, wherein
    each combination of the values of the M color components constituting the color gamut has a minimum total sum of the values of the M color components among combinations of values of the M color components that provide a corresponding one of target colors by an output device that outputs a color using M colors, and
    each combination of the values of the M color components meets a predetermined limitation;
  obtaining output color signals each having values of the M color components as elements by controlling, within a range meeting the predetermined limit, combinations of values of the M color components each of which provide any of colors within the set color gamut; and generating pairs each having (i) a corresponding one of the obtained output color signals and (ii) an input color signal which is in an input color space, corresponds to the corresponding one of the output color signals, represents a color within the set color gamut, and has values of N color components as elements where N is an integer smaller than M.

* * * * *